United States Patent
Prakash et al.

(10) Patent No.: US 10,411,806 B2
(45) Date of Patent: Sep. 10, 2019

(54) GRIDLESS OPTICAL ROUTING AND SPECTRUM ASSIGNMENT

(71) Applicant: Ciena Corporation, Hanover, MD (US)

(72) Inventors: Anurag Prakash, Noida (IN); Dominic Richens, Perth (CA); Seemant Bisht, New Delhi (IN); Mohit Chhillar, Pitam Pura (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/282,019

(22) Filed: Sep. 30, 2016

(65) Prior Publication Data

US 2018/0006757 A1    Jan. 4, 2018

(30) Foreign Application Priority Data

Jun. 29, 2016  (IN) ............................. 20161022449

(51) Int. Cl.
*H04J 14/02*  (2006.01)
*H04B 10/27*  (2013.01)

(52) U.S. Cl.
CPC .......... *H04B 10/27* (2013.01); *H04J 14/0257* (2013.01); *H04J 14/0267* (2013.01); *H04J 14/0272* (2013.01)

(58) Field of Classification Search
None
See application file for complete search history.

(56) References Cited

U.S. PATENT DOCUMENTS

| | | | | |
|---|---|---|---|---|
| 5,936,348 A * | 8/1999 | Shimoi | ................... | H01J 43/22 313/103 CM |
| 5,963,348 A * | 10/1999 | Oberg | ................. | H04J 14/0227 398/5 |
| 7,424,223 B1 * | 9/2008 | Lundquist | .......... | G02B 6/12021 385/24 |
| 9,369,785 B1 * | 6/2016 | Schmidtke | .............. | H04L 45/38 |
| 9,831,978 B1 * | 11/2017 | Mehrvar | .............. | H04J 14/0201 |
| 2004/0101302 A1 * | 5/2004 | Kim | .................... | H04J 14/0298 398/45 |
| 2004/0208557 A1 * | 10/2004 | Bach | ....................... | H01L 35/00 398/57 |

(Continued)

OTHER PUBLICATIONS

Wikipedia, Integer programming, http://en.wikipedia.org/wiki/Integer_programming.*

(Continued)

*Primary Examiner* — Kenneth N Vanderpuye
*Assistant Examiner* — Jai M Lee
(74) *Attorney, Agent, or Firm* — Clements Bernard Walker PLLC; Christopher L. Bernard; Lawrence A. Baratta, Jr.

(57) ABSTRACT

A method implemented by a processing device for gridless optical routing and spectrum assignment on links in an optical network includes, responsive to one or more new channel requests, performing a path computation utilizing frequency markers to determine feasibility of the one or more new channel requests, wherein the optical spectrum is represented as a real line with the frequency markers indicative of used optical spectrum; allocating the one or more new channel requests based on the path computation and allocation criteria; and responsive to allocating the one or more new channel requests, updating the associated frequency markers on the real line.

20 Claims, 18 Drawing Sheets

(56) References Cited

U.S. PATENT DOCUMENTS

| | | | | |
|---|---|---|---|---|
| 2004/0247317 A1* | 12/2004 | Sadananda | H04L 45/02 | 398/57 |
| 2006/0153496 A1* | 7/2006 | Tanobe | H04J 14/0227 | 385/24 |
| 2007/0121612 A1* | 5/2007 | Nadeau | H04L 12/2801 | 370/386 |
| 2007/0212067 A1* | 9/2007 | Miyazaki | H04J 14/0227 | 398/57 |
| 2012/0201539 A1* | 8/2012 | Boertjes | H04J 14/0204 | 398/51 |
| 2012/0321306 A1* | 12/2012 | Wellbrock | H04J 14/021 | 398/48 |
| 2012/0328296 A1* | 12/2012 | Sullivan | H04J 14/026 | 398/79 |
| 2013/0045006 A1* | 2/2013 | Dahan | H04J 14/0257 | 398/34 |
| 2013/0170834 A1* | 7/2013 | Cho | H04J 14/0278 | 398/58 |
| 2013/0188490 A1* | 7/2013 | Morper | H04W 28/10 | 370/235 |
| 2014/0010535 A1* | 1/2014 | Oi | H04J 14/0212 | 398/48 |
| 2014/0016939 A1* | 1/2014 | Patel | H04J 14/0227 | 398/79 |
| 2014/0133863 A1* | 5/2014 | Mizutani | H04J 14/0257 | 398/79 |
| 2014/0328587 A1* | 11/2014 | Magri | H04L 45/62 | 398/26 |
| 2014/0334817 A1* | 11/2014 | Miedema | H04Q 11/0062 | 398/48 |
| 2014/0341572 A1* | 11/2014 | Sambo | H04J 14/0257 | 398/48 |
| 2015/0117850 A1* | 4/2015 | Prakash | H04B 10/032 | 398/2 |
| 2015/0229404 A1* | 8/2015 | Boertjes | H04B 10/516 | 398/183 |
| 2015/0333824 A1* | 11/2015 | Swinkels | H04J 14/0227 | 14/227 |
| 2017/0142505 A1* | 5/2017 | Maamoun | H04Q 11/0066 | |

OTHER PUBLICATIONS

Wikipedia, Hamiltonian path problem, http://en.wikipedia.org/wiki/Hamiltonian_path_problem.*

Wikipedia, Finite-state machine, http://en.wikipedia.org/wiki/Finite-state_machine.*

Lorenz, Ulf, Algorithmic Discrete Mathematics, 2012, Technische Universitat Darmstadt.*

Ramaswami et al., Optical Networks, 2010, Elsevier, pp. 469-507.*

* cited by examiner

GRIDLESS OPTICAL ROUTING AND SPECTRUM ASSIGNMENT

CROSS-REFERENCE TO RELATED APPLICATION(S)

The present patent application/patent claims the benefit of priority of Indian Patent Application No. 20161022449, filed on Jun. 29, 2016, and entitled "GRIDLESS OPTICAL ROUTING AND SPECTRUM ASSIGNMENT," the contents of which are incorporated in full by reference herein.

FIELD OF THE DISCLOSURE

The present disclosure generally relates to optical networking systems and methods. More particularly, the present disclosure relates to gridless optical routing and spectrum assignment in optical networks.

BACKGROUND OF THE DISCLOSURE

Routing and Wavelength Assignment (RWA) is a well-known problem for fixed grid optical networks while Routing and Spectrum Assignment (RSA) is its equivalent term to the same problem for flexible grid optical networks or gridless optical networks. In fixed grid optical networks, wavelengths are spaced apart from each other according to a wavelength spectrum grid defined by International Telecommunication Union (ITU) in ITU-T G.694.1 (02/12), "Spectral grids for WDM applications: DWDM frequency grid," the contents of which are incorporated by reference. In flexible grid optical networks, which is also described in ITU Recommendation G.694.1 "Spectral grids for WDM applications: DWDM frequency grid" (02/12), each signal can be allocated to spectrum with different widths optimized for the bandwidth requirements of the particular bit rate and modulation scheme of the individual channels. Note, flexible grid networks may still utilize a grid, albeit at a much finer granularity than grid networks (e.g., 6.25 GHz vs. 50 GHz). On the other hand, gridless networks have no such grid constraints. The ultimate objective of RWA or RSA is to find a wavelength or spectrum assignment on a route for a particular channel in the optical network, such assignment and routing being optimal in some manner.

Existing approaches to RSA generally use a grid with either a sliding window or Integer Linear Programming (ILP)-based approaches. For RSA, in comparison with RWA, there is no concept of frequency spacing on gridless spectrum, i.e., each channel is allocated a spectral range instead of a number of fixed grid slots. Thus, it is difficult and non-optimal to adapt existing RWA techniques to support RSA on flex grid or gridless spectrum.

BRIEF SUMMARY OF THE DISCLOSURE

In an exemplary embodiment, a method implemented by a processing device for gridless optical routing and spectrum assignment on links in an optical network includes, responsive to one or more new channel requests, performing a path computation utilizing frequency markers to determine feasibility of the one or more new channel requests, wherein the optical spectrum is represented as a real line with the frequency markers indicative of used optical spectrum; allocating the one or more new channel requests based on the path computation and allocation criteria; and, responsive to allocating the one or more new channel requests, updating the associated frequency markers on the real line. The allocating can utilize a modified graph and the allocating, which is one or more of grouped and interleaved based on varying Guard Bands and Dead Bands, is based on a minimal Hamiltonian path through the modified graph. The method can further include flooding updates via a control plane subsequent to the updating. The new channel request can include a media channel or a super channel. The representing can further include utilizing a grid vector in addition to the frequency markers, wherein the grid vector delineates the optical spectrum into finely granular grids for management thereof. The path computation can be performed via a Finite State Machine using the frequency markers to determine the feasibility for each link. The method can further include utilizing a bipartite graph for bin packing to assign non-contiguous optical channels of the one or more new channel requests. The allocating can include an expansion factor enabling the one or more new channel requests to support additional capacity. The allocating can include first attempting to assign the one or more new channel requests to gaps in existing media channels.

In another exemplary embodiment, an apparatus for gridless optical routing and spectrum assignment on links in an optical network includes circuitry adapted to perform a path computation utilizing frequency markers to determine feasibility of the one or more new channel requests responsive to one or more new channel requests, wherein the optical spectrum is represented as a real line with the frequency markers indicative of used optical spectrum; circuitry adapted to allocate the one or more new channel requests based on the path computation and allocation criteria; and circuitry adapted to update the associated frequency markers on the real line responsive to allocation of the one or more new channel requests. The circuitry adapted to allocate can utilize a modified graph and the allocating, which is one or more of grouped and interleaved based on varying Guard Bands and Dead Bands, is based on a minimal Hamiltonian path through the modified graph. The apparatus can further include circuitry adapted to flood updates via a control plane subsequent to updates. The new channel request can include a media channel or a super channel. The circuitry adapted to represent can further utilize a grid vector in addition to the frequency markers, wherein the grid vector delineates the optical spectrum into finely granular grids for management thereof. The path computation can be performed via a Finite State Machine using the frequency markers to determine the feasibility for each link. The apparatus can further include circuitry adapted to utilize a bipartite graph for bin packing to assign non-contiguous optical channels of the one or more new channel requests. The circuitry adapted to allocate can utilize an expansion factor enabling the one or more new channel requests to support additional capacity. The circuitry adapted to allocate can first attempt to assign the one or more new channel requests to gaps in existing media channels.

In a further exemplary embodiment, a processing device adapted for gridless optical routing and spectrum assignment on links in an optical network includes a processor; and memory storing instructions that, when executed, cause the processor to, responsive to one or more new channel requests, perform a path computation utilizing frequency markers to determine feasibility of the one or more new channel requests, wherein the optical spectrum is represented as a real line with the frequency markers indicative of used optical spectrum, allocate the one or more new channel requests based on the path computation and allocation criteria, and, responsive to allocation of the one or more new channel requests, update the associated frequency markers on the real line. The one or more new channel requests can be allocated using a modified graph and based on a minimal Hamiltonian path through the modified graph, wherein the allocation is one or more of grouped and interleaved based on varying Guard Bands and Dead Bands.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to gridless optical routing and spectrum assignment in optical networks. Elastic Optical Networks (EON) converts DWDM fixed grid spectrum slot widths into adaptable spectral width slots based on service requirements, which are a function of data rate, modem type, and signal reach. Hence, efficient utilization of the available optical spectrum can be achieved based on flexible grids. In an exemplary embodiment, systems and methods provide an in-skin (i.e., implemented in the optical network) Routing and Spectrum Assignment (RSA) scheme with a spectrum-based cost function for a distributed control plane implementation. The systems and methods utilize a routing-based algorithm and a single scan of the link vectors during path computation, to provide a fast routing and spectral allocation algorithm. Secondly, for the non-contiguous allocation problem which is Non-Deterministic Polynomial-time (NP) hard, a constrained branch and bound bin-packing algorithm is provided. The systems and methods achieve a polynomial time routing and spectrum assignment as described herein. The systems and methods include two similar approaches—i) a grid agnostic approach and ii) a fine granular spectrum (e.g., 6.25 GHz) for heterogeneous networks with either type of approaches, i.e., flex grid and gridless. The systems and methods provide spectrum allocation for future expansions of Media Channels (MCs). The systems and methods also provide spectrum allocation for non-contiguous MCs. The systems and methods include flooding mechanisms for flex grid and gridless networks as well as the use of user-provided NMC (Network Media Channels) and MC spectral assignment and routing constraints. Finally, the systems and methods allow user provided spectrum constraints for NMC and MC spectral bands and center frequencies along with Guard Bands (GB) and Dead Bands (DB).

A gridless solution provides an optimal solution whereas a grid-based solution alone deprecates spectral slots even if they are partially occupied. For example, in the case of 50 MCs, there may be a loss of about 325 GHz bandwidth which can accommodate about nine more NMCs with 37.5 GHz each. The systems and methods include a grid/gridless model with one MC segment which finds a contiguous spectral MC segment along a given route based on a routing cost function. This incrementally calculates the contiguous MC spectral segment and provides all possible MC segments for K route and runs in constant time O(N)/O(m*log$_2$ m+m) respectively for every link. Here N is the number of grid slots whereas m is the number of MC already allocated on the link. For non-contiguous MC allocation, this is an NP-hard problem and is approached based on a polynomial time greedy or best-fit mechanism.

Exemplary Optical Network

Figure 1:
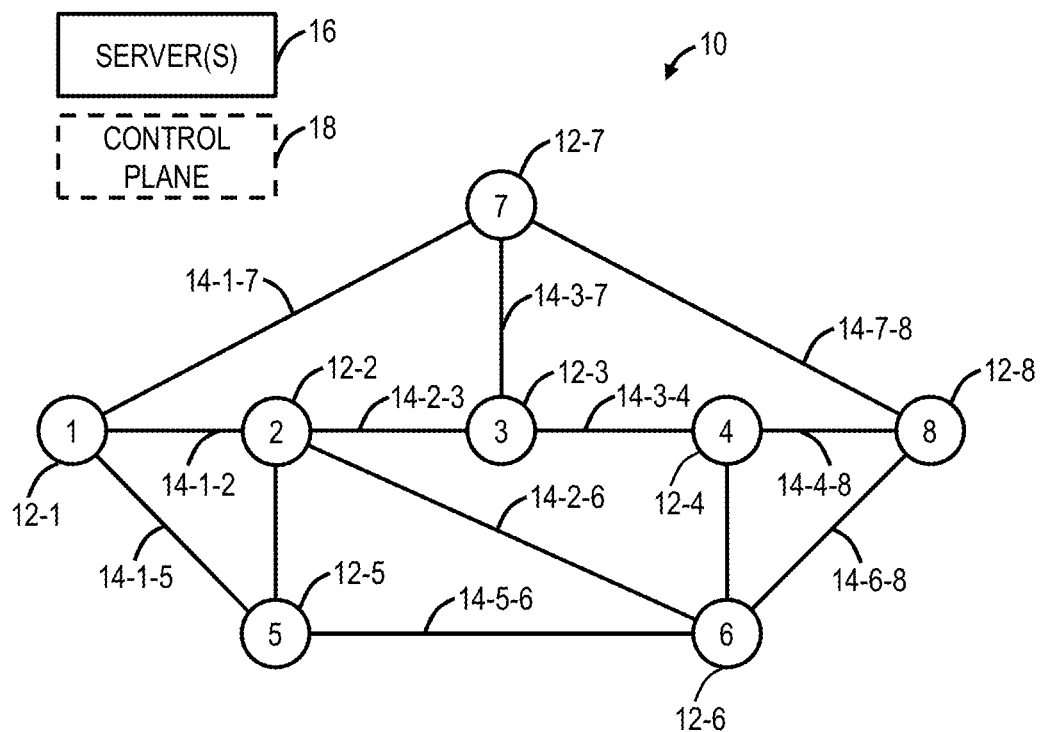
FIG. 1 is a network diagram of an optical network with nodes interconnected by optical links.

Referring to FIG. 1, in an exemplary embodiment, a network diagram illustrates a network 10. The network 10 includes nodes 12, labeled as nodes 12-1-12-8, interconnected to one another via links 14 which physically can include one or more optical fibers. The nodes 12 can also be referred to as network elements and can include, without limitation, Wavelength Division Multiplex (WDM) terminals, Dense WDM (DWDM) terminals, Optical Add/Drop Multiplexers (OADMs), Reconfigurable OADMs (ROADMs), optical cross connects, optical switches, Packet-Optical Transport Systems (POTS), and the like. In various exemplary embodiments, the nodes 12 include various hardware and software to communicate with one another via wavelengths, timeslots, packets, etc. At a physical layer, the nodes 12 provide one or more wavelengths between one another over the links 14. Note, while FIG. 1 shows a single node 12 at each location, there can be multiple devices or network elements providing multiple wavelengths, MCs, Superchannels (SC), etc.

For illustration purposes, each of the links is labeled as link 14-X-Y where X and Y are the nodes interconnected by the links 14. The links 14 utilize spectrum governed by ITU-T G.694.1 (02/12) for both fixed and flexible. Additionally, the links 14 can utilize spectrum which is completely gridless, i.e., without any defined grid or flexible grid. The purpose of RWA/RSA is to assign optimally wavelengths or spectrums across the links 14 in a manner that minimizes chances of blocking in the network 10. Blocking means that a particular wavelength or spectrum is unavailable on one or more links, preventing a connection. Stated different, RWA/RSA answers the question of which wavelength or spectrum should be assigned to a particular A-Z connection in the network 10 in a manner that minimizes the chance of blocking and/or other optimization objectives.

The network 10 can also include one or more servers 16 and/or a control plane 18. The servers 16 can include or operate as, for example, a Software Defined Networking (SDN) controller, an SDN application, a Network Management System (NMS), an Element Management System (EMS), a planning tool, a Path Computation Element (PCE), etc. The control plane 18 provides an automatic allocation of network resources in an end-to-end manner. Exemplary control planes may include Automatically Switched Optical Network (ASON) as defined in ITU-T G.8080/Y.1304, Architecture for the automatically switched optical network (ASON) (02/2012), the contents of which are herein incorporated by reference; Generalized Multi-Protocol Label Switching (GMPLS) Architecture as defined in IETF Request for Comments (RFC): 3945 (10/2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections. That is, the control plane 18 is configured to establish end-to-end signaled connections to route the connections and program the underlying hardware accordingly. SDN provides the management of network services through abstraction of lower-level functionality. This is done by decoupling the system that makes decisions about where traffic is sent (the control plane) from the underlying systems that forward traffic to the selected destination (the data plane). In various exemplary embodiments, the systems and methods can be implemented, in-skin, through the nodes 12, the servers 16, and/or the control plane 18.

Media Channel (MC) and Superchannel (SC)

As described herein, an MC is a plurality of optical channels that are commonly routed together in the optical network 10 between the same source and destination nodes 12. The MC includes contiguous spectrum with no or little spectral gaps (guard bands, dead bands) between the plurality of optical channels. The plurality of optical channels is each separate data channels which are originated and terminated on different optical modems. For example, for a specific optical channel, a coherent modem can demodulate the optical channel based on tuning of a Local Oscillator (LO) or the like. An SC is a combination of optical channels to create a unified channel of a higher data rate. Advantageously, MCs and SCs are Nyquist or super-Nyquist channel spacing. The difference between the MC and the SC is that the MC are separate channels whereas the SC is a unified channel. However, from a spectrum perspective, the MC and the SC appear similar—a grouping of spectrum dedicated between A-Z points in the network 10 over the links 14. In the foregoing descriptions, reference is made to MCs, but those of ordinary skill in the art will appreciate the same techniques apply equally to SCs. NMCs are Network Media Channels and are channels provided in an MC. The goal of the systems and methods herein is to route NMCs optimally to minimize MC size and allow for MC expansion.

Routing and Spectrum Assignment

The flexible grid or gridless allows for bandwidth squeezing and Nyquist/super-Nyquist channel spacing since the center frequencies are not rigid. However, to be able to resolve to any frequency, the links 14 have to be gridless or use a very fine granularity. One of the solutions being implemented is to provide very low granularity mini-grid (6.25 GHz spacing) with limited tuning resolution, instead of fine-tuning to every possible wavelength in the spectrum. The Routing and Spectrum Assignment (RSA) needs to be Contiguous: Only one MC fragment allowed between any two nodes 14, so all Network MCs (NMC) should fit into one MC along with dead bands (filter roll-offs) and guard bands;

Non-Contiguous: More than one MC fragment allowed between any two nodes 14, so all NMC should fit into multiple MC fragments along with dead bands (filter roll-offs) and guard bands. Each MC here is bounded with its own dead band. Thus, this is not very efficient but still if the link bandwidth is fragmented, this may still provide a feasible solution; and Continuous: Spectral continuity is a requirement just like RWA.

Along with above-mentioned constraints the links 14 in network 10 can be modeled as either:

Fine granular grid: Spectrum allocation is in chunks of this minimal grid size such as 6.25 GHz; and Gridless: Spectral allocation is actually on the line of real numbers to the resolution required.

Figure 2:
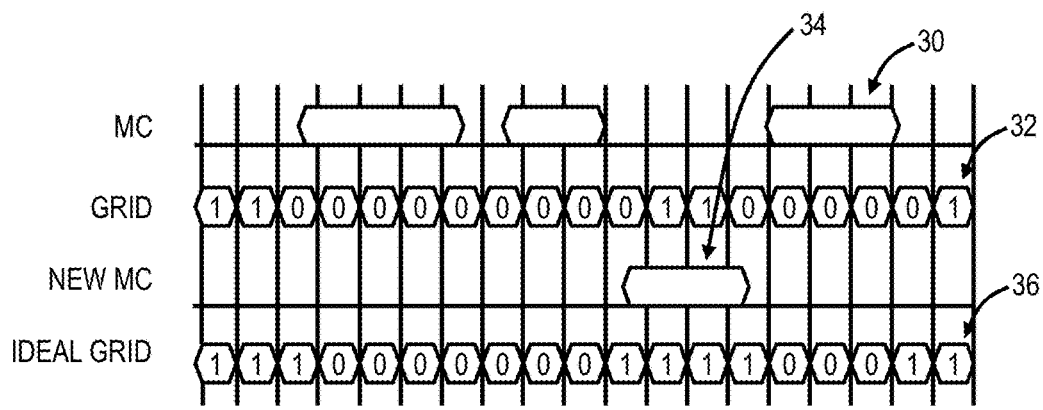
FIG. 2 is a graph of grid vectors and Media Channels (MCs) illustrating existing MCs with an associated grid vector, and a new MC is not supported even though the spectral width is available, but the grid is fine granular but still not gridless to support an ideal grid vector.
Figure 3:
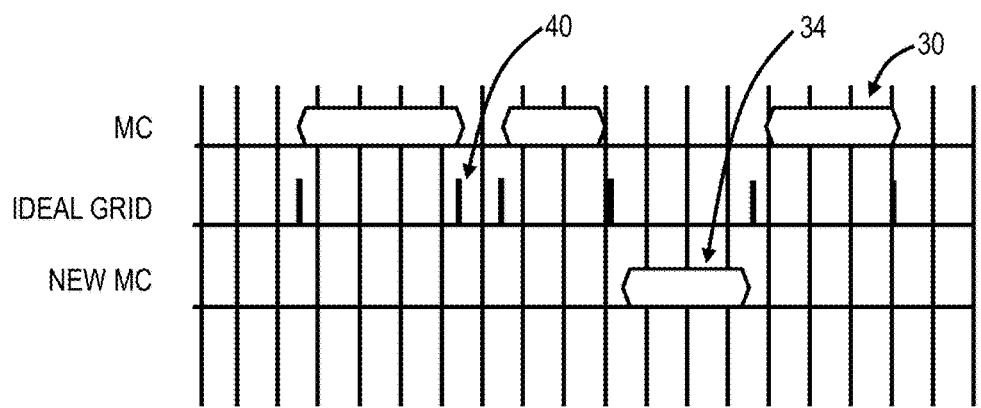
FIG. 3 is a graph of grid vectors and Media Channels (MCs) illustrating the same MCs as in FIG. 2 with the new MC accommodated in a gridless architecture through the use of markers in a gridless approach.
Figure 4:
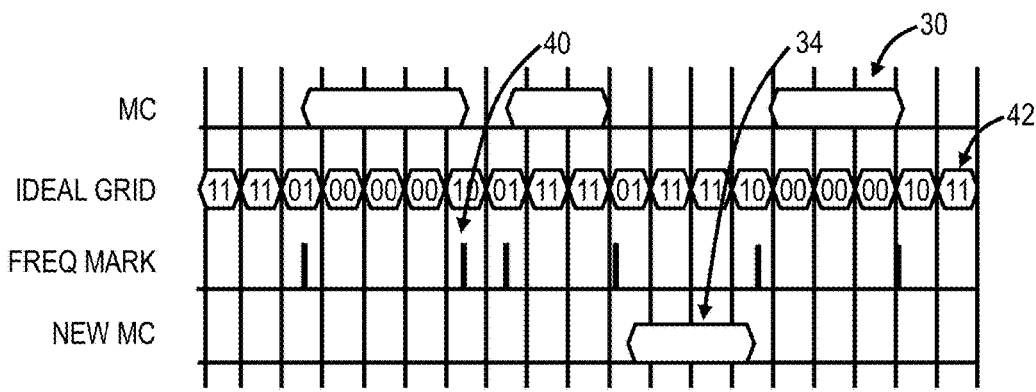
FIG. 4 is a graph of grid vectors and Media Channels (MCs) illustrating the same MCs as in FIGS. 2 and 3 with the new MC accommodated in a fine granular grid with an ideal grid vector as well as through use of the markers.

Referring to FIGS. 2, 3, and 4, in an exemplary embodiment, graphs illustrate grid vectors and MCs. FIG. 2 illustrates existing MCs 30 with an associated grid vector 32 and a new MC 34 is not supported even though the spectral width is available, but the grid is fine granular but still not gridless to support an ideal grid vector 36. FIG. 3 illustrates the same MCs 30, 34 as in FIG. 2 with the MC 34 accommodated in a gridless architecture through the use of markers 40 in a gridless approach. FIG. 4 illustrates the same MCs 30, 34 as in FIGS. 2 and 3 with the MC 34 accommodated in a fine granular grid with an ideal grid vector 42 as well as through the use of the markers 40.

The rationale to support a gridless mechanism over a fine granular grid is shown in FIGS. 2, 3, and 4. FIG. 2 represents the case where flex grid links 14 are represented as a fine grid of 6.25 GHz granularity. The existing allocation of spectrum is indicated by row MC 30. The corresponding grid vector 32 is indicated by 0 or 1 where 0 means spectral grid slot is not available. Now, the new MC 34 can actually fit in the flex grid link 14, but the grid vector 32 prohibits the same. The ideal grid vector 36 should be as indicated in the FIG. 1. However, as indicated in FIG. 3, a complete gridless solution with frequency markers 40 on a real line accommodates for the above mentioned new MC 34 and thus provides an optimal solution. In FIG. 4, a hybrid solution with the grid and frequency markers 40 provides a solution for the same it is required to use a grid-based model, such as for Operations, Administration, Maintenance, and Provisioning (OAM&P). Secondly, a user specified or SDN allocated scheme for MC frequencies, if available, should be honored irrespective of the internal link representation schemes.

In summary, a gridless solution provides the optimal solution, whereas a grid based solution alone blocks spectral slots even if they are partially occupied and in the case of 50+ MCs this may lead to a loss of (325 GHz) bandwidth which can accommodate approximately 9 more NMCs with 37.5 GHz bandwidth each. Thus, in an exemplary embodiment, the systems and methods propose spectrum management using frequency markers 40 with or without grid vectors 32, 36, 42 to optimize placement of MCs 30, 34.

Figure 5:
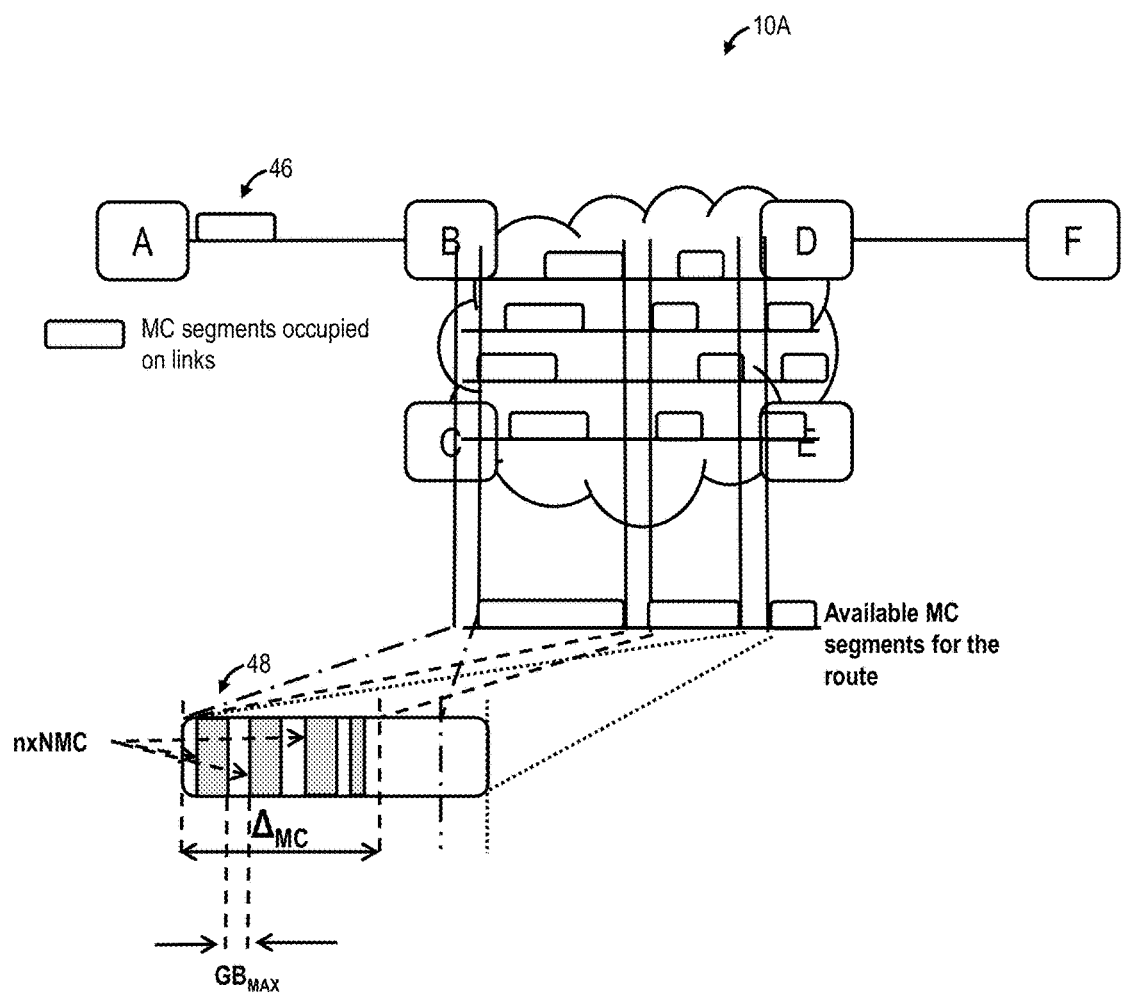
FIG. 5 is a network diagram of a graph on a network of spectrum usage to illustrate the RSA grid/gridless problem definition.

Referring to FIG. 5, in an exemplary embodiment, a network diagram illustrates a graph on a network 10A of spectrum usage to illustrate the RSA grid/gridless problem definition. The network 10A includes six nodes A, B, C, D, E, F, with MC segments 46 and n×NMC 48 in the MC segments 46. The RSA problem includes determining the order of NMC to use the minimal GB thus leading to the minimal MC size. To do so, the RSA problem includes finding all possible NMC segments 46 along all K routes and then determining allocation amongst the possible spectral gaps.

RSA Algorithm

Figure 6:
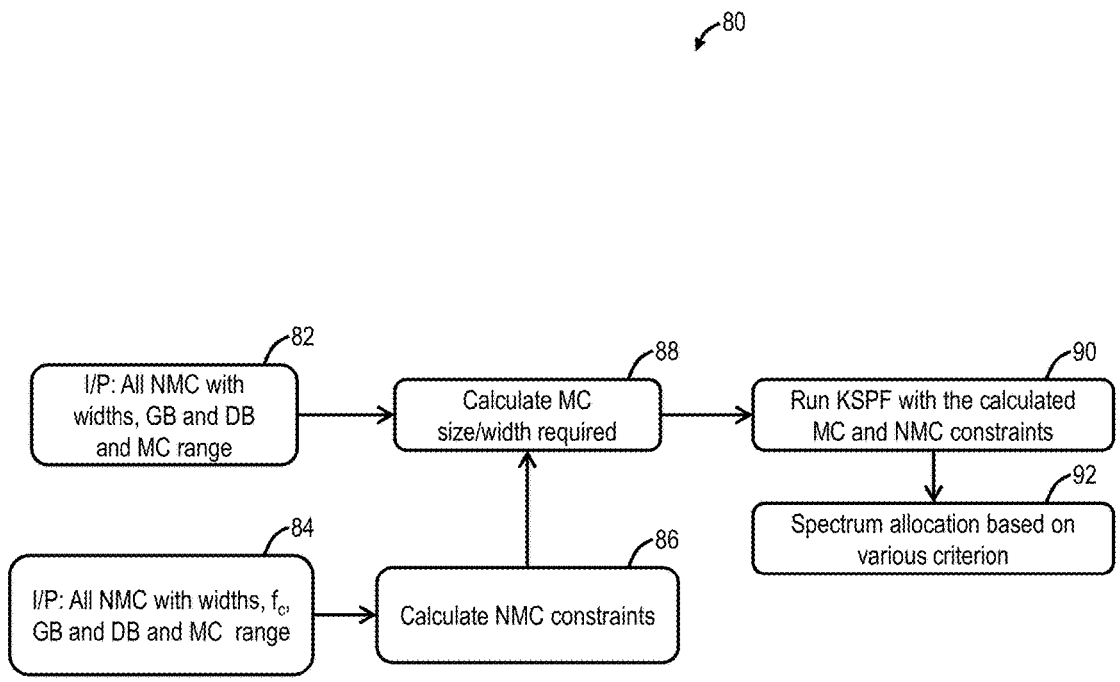
FIG. 6 is a flowchart of an RSA process for determining order of NMCs to use the minimal Guard Band (GB) thus leading to the minimal sized MC.

Referring to FIG. 6, in an exemplary embodiment, a flowchart illustrates an RSA process 80 for determining the order of NMCs to use the minimal GB thus leading to the minimal sized MC. The process 80 in an NP-complete problem and is mapped to a Hamiltonian path problem. This is due to the fact that different NMC with different Modem schemes will have differing GB amongst them leading to a complete graph Kn. Thus, a Hamiltonian path is feasible but to find the same all possibilities need consideration. The process 80 includes first finding all the possible MC segments along all K routes (e.g., a technique is described in FIGS. 7-11). Here the additional cost is to scan individual link once during the K-Shortest Path First (K-SPF). This is given by O(N) or O(m*log(m)+m) for grid based or gridless RSA. Here N is the number of grid slots whereas m is the number of MC already allocated on the link. Once all possible MC segments are determined along all K routes, second, the process 80 includes determining where to place the allocation amongst the possible spectral gaps such as using the best fit algorithm to pack or the best fit with an expansion criterion.

The process 80 includes integer programming (I/P) with all NMC with associated widths, GB and DB, and MC ranges (step 82) along with all NMC with associated widths, center frequencies ($f_c$), GB and DB, and MC ranges (step 84). Step 84 is used to determine NMC constraints (step 86). Next, the process 80 includes calculating MC size/width required (step 88), running K-SPF with the calculated MC and NMC constraints (step 90), and performing spectrum allocation based on various criterion (step 92).

The idea is to figure out which NMCs modem schemes should be interleaved or grouped. Not specifically to find the optimal solution but sub-optimal one, since that would be an NP-complete problem.

Routing—Grid Model with One MC Segment

Figure 7:
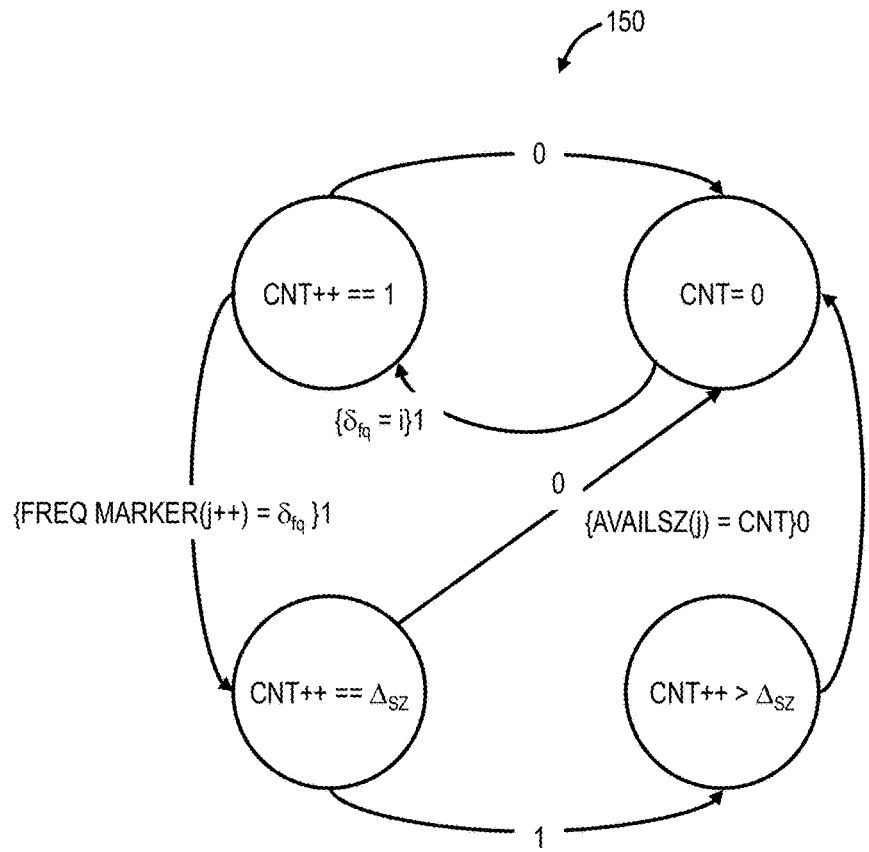
FIG. 7 is a flow diagram of a Finite State Machine (FSM) for a grid model with one MC segment.

Referring to FIG. 7, in an exemplary embodiment, a flow diagram illustrates a Finite State Machine (FSM) 150 for a grid model with one MC segment. For a grid model with one MC segment, as part of routing constraints, one must:

Find all possible spectral segments along K-routes, which can accommodate all the specified NMCs with the required Dead Bands (DBs) and Guard Bands (GBs);

Allow for MC and NMC constraints, since the NMC center frequencies or the allowable MC minimum/maximum spectral range values could be specified by the user, which adds additional constraints. These constraints are again represented as a grid vector similar to another link. Thus, these constraints simply act as virtual links for feasibility criterion; and A simple AND operation of the link grid vectors provide for the vector to be used in the FSM 50.

In the FSM 150, i is the running index of the spectral grid slot, and j indicates the number of MC fragments available. The values of the available MC fragment start grid index and the corresponding size of the spectral slot is updated in freqMarker[j] and availsz[j]. Here 1 and 0 indicate if the $i^{th}$ grid slot is free or not, thus dictating state transition amongst four states. The statement within f . . . g is the update during that state transition, followed by the event triggering the state transition.

The reason to find all available spectrum segments greater than or equal to requested MC size is to allow for different allocation schemes with consideration of MC expansion and corresponding expansion criterion as explained herein. The solution here comes from a counting queuing problem in the following manner. The simple queuing process in the FSM 150 scans the link grid vector and provides a feasibility criterion as well as the all the starting frequency markers with the available size. The following variables be defined in units of grid slots:

| | |
|---|---|
| $\Delta_{sz}$ | Media Channel size |
| $\delta_{fq}$ | frequency marker for available spectrum |
| freqMarker[ ] | an array of frequency markers |
| availsz[ ] | an array of avail spectral size at freqMarker[ ] |

During a single scan of a grid vector for a single link 14, the feasibility of the link 14 as well as all (freqMarker[ ] and availsz[ ]) information is provided based on the simple queuing process provided in the FSM 150. Thus, it is O(n) operation where n is the number grid slots the spectrum is divided into.

Figure 8:
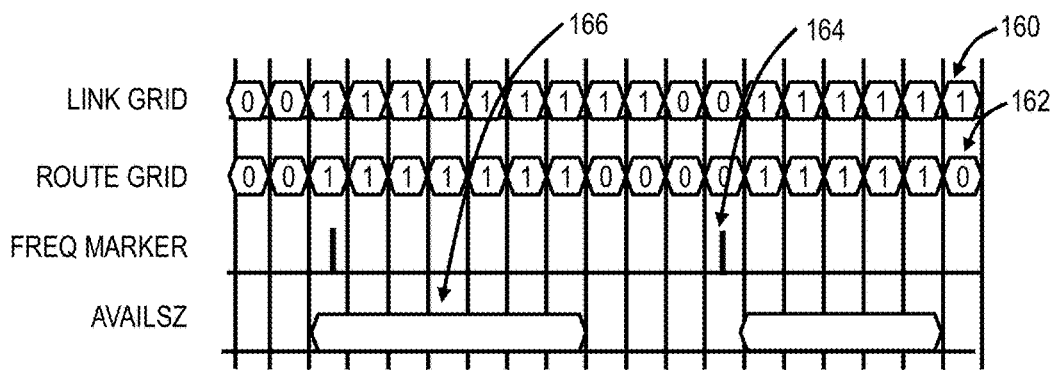
FIG. 8 is a graph of grid vectors and marks illustrating a result of the FSM of FIG. 7 for a given link.

Referring to FIG. 8, in an exemplary embodiment, a graph of grid vectors and marks illustrates a result of the FSM 150 for a given link 14. FIG. 8 includes a link grid 160 which is the new link 14 being assessed and a route grid 162 which is a partial route grid evaluated via K shortest path first (K-SPF) along with virtual link grids considered for NMC and MC constraints. The output of FSM 150 is provided as freqMarker 164 and availsz 166. This works for both contiguous as well as noncontiguous MC allocation where the $\Delta_{sz}$ in FSM state {cnt++=$\Delta_{szg}$} can be replaced by $\Delta_{sz}$=min [$NMC_{size}$+2*DB] where DB is the Dead Band. The result of the FSM 150 is given by the freqMarker 64 and the availsz 616. This is easy to see that eventually for each route provided by K-SPF, one will have all the possibilities of spectrum allocation available, and any specific or mixed criterion can be chosen for final spectrum allocation. Since this data is also available in an incremental fashion during computation, one can also devise various cost factors based on spectrum availability to reorder routes within the computation process.

Routing—Gridless Model with One MC Segment

Figure 9:
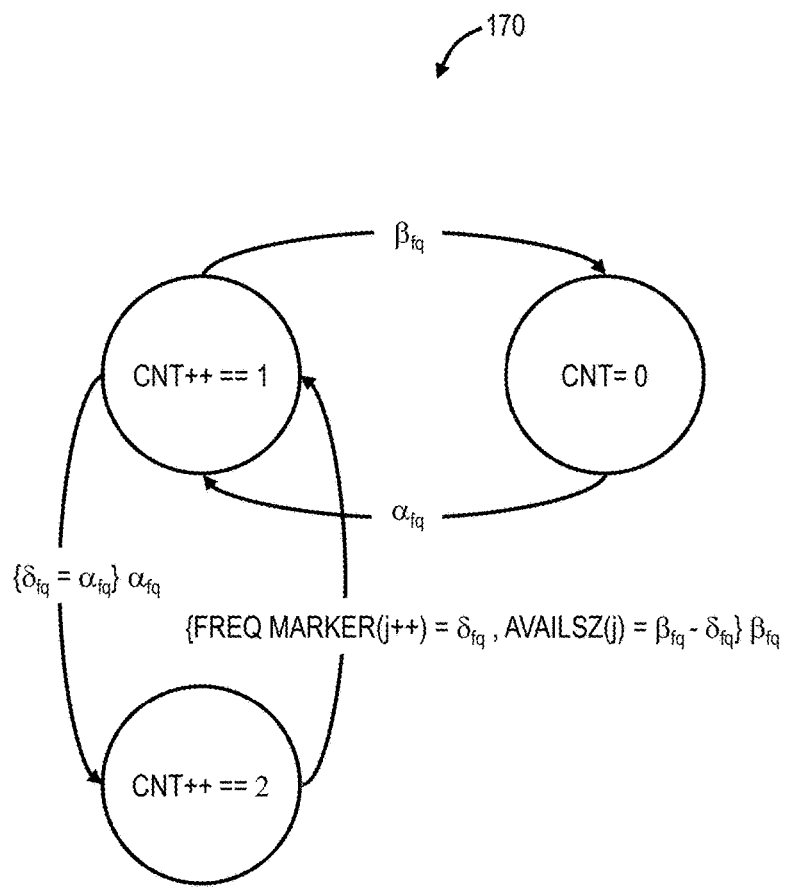
FIG. 9 is a flow diagram of a Finite State Machine (FSM) for a gridless model with one MC segment.

Referring to FIG. 9, in an exemplary embodiment, a flow diagram illustrates a Finite State Machine (FSM) 170 for a gridless model with one MC segment. The gridless model follows similarly to the previous approach except for the change from a grid index to actual frequency values. The frequency markers 40 are picked up for both the links and the routes and arranged in increasing order (heap sort) with both start and end indications. The FSM 170 is evaluated on this sorted array of values. The following variables are defined in units of MHz.

| | |
|---|---|
| $\Delta_{sz}$ | Media Channel size |
| $\delta_{fq}$ | frequency marker for available spectrum |
| $\alpha_{fq}$ | frequency mark for start of available spectrum |
| $\beta_{fq}$ | frequency mark for end of available spectrum |
| freqMarker[ ] | an array of frequency markers |
| availsz[ ] | an array of avail spectral size at freqMarker[ ] |

Here j indicates the number of MC fragments available. The values of the available MC fragment start frequency and the corresponding size of the spectral slot is updated in freqMarker[j] and availsz[j]. Here, $\alpha_{fq}$ and $\beta_{fq}$ indicate start and end frequency of available spectrum dictating state transition amongst four states. The statement within f . . . g is the update during that state transition, followed by the even triggering the state transition.

During a single scan of the sorted vector of frequencies for multiple links, one can get the feasibility of the link as well as all (freqMarker[ ] and availsz[ ]) information based on the simple queuing process provided in the FSM 170. Thus, it is $O(n \log_2 n)+O(n)$ operation where n is the number of frequency markers for the spectrum in the links considered. Thus, multiple links can also be evaluated at the same time by extending the queuing FSM 170 further to the count of links.

Figure 10:
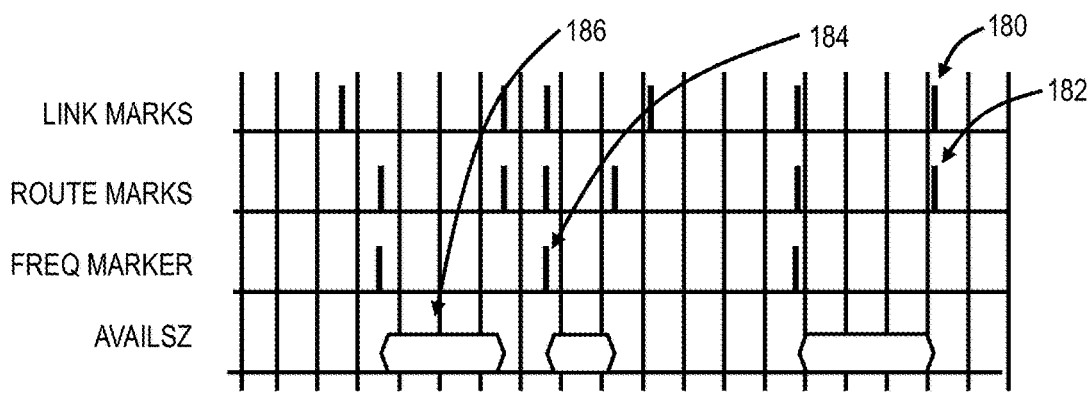
FIG. 10 is a graph of grid vectors and marks illustrating a result of the FSM of FIG. 9 for a given link.

Referring to FIG. 10, in an exemplary embodiment, a graph of marks and Media Channels (MCs) illustrates a result of the FSM 170 for a given link 14. FIG. 10 includes link markers 180 which are on the new link being assessed and route markers 182 which are a partial route grid evaluated via K-SPF along with virtual link grids considered for NMC and MC constraints. The output of FSM 170 is provided as freqMarker 184 and availsz 186. This works for both contiguous as well as noncontiguous MC allocation where the check for minimal MC size ($\Delta_{sz}$) in FSM state {availsz[j]==$\Delta_{szg}$} can be indicated by $\Delta_{sz}$=min[NMC$_{size}$+2*DB] where DB is the Dead Band.

FSMs and the RSA Process 80

The FSMs 150, 170 can be run for every link pair between a source and destination to determine MC spectrum for both a grid and a gridless approach. The FSMs 150, 170 can be used in step 88 of the process 80. The output of the FSMs 150, 170 are MC constraints reduced to a virtual link and NMC constraints reduced to a virtual link, and the outputs are used in step 90 to run K-SPF with the calculated MC and NMC constraints.

Calculating MC Size

Figure 11:
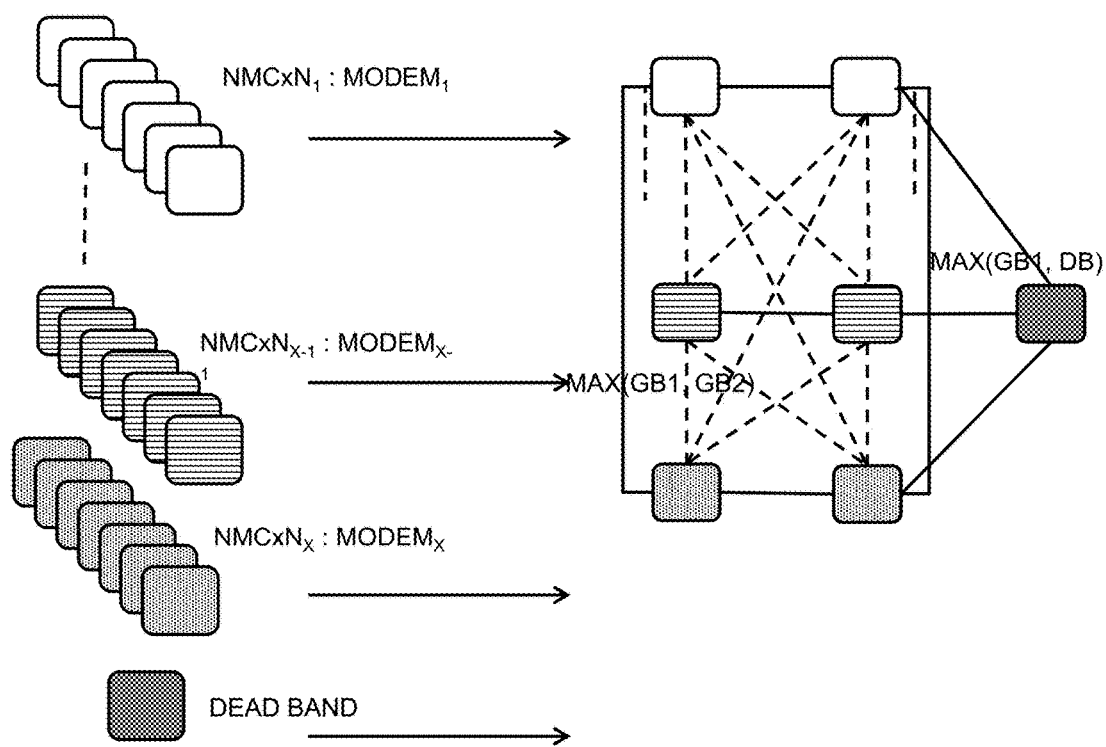
FIG. 11 is a graph of a modified graph algorithm for calculating MC size with the RSA process of FIG. 6.

Referring to FIG. 11, in an exemplary embodiment, a graph illustrates a modified graph algorithm for calculating MC size with the process 80. The graph includes X modems for NMC×N$_X$ and a DB. FIG. 11 is a modified K$_n$ graph for finding a Hamiltonian Path since the modified graph is a (hypercube+diagonals+one node) connected to all dimensions. Thus, there exists a Hamiltonian path. A reduced graph represents only unique GB edges. Each edge weight is either MAX(GB1, GB2) or MAX(GBx, DB) and a minimal Hamiltonian path yields the minimal MC size. NMC×N$_x$ is snapped to a maximum of 2 nodes in the graph reducing the size of the problem. Thus, this approach is independent of the number of NMCs and only dependent on unique modem schemes. If the reduced set is greater than 8 nodes, a first fit algorithm can be executed first.

Figure 12:
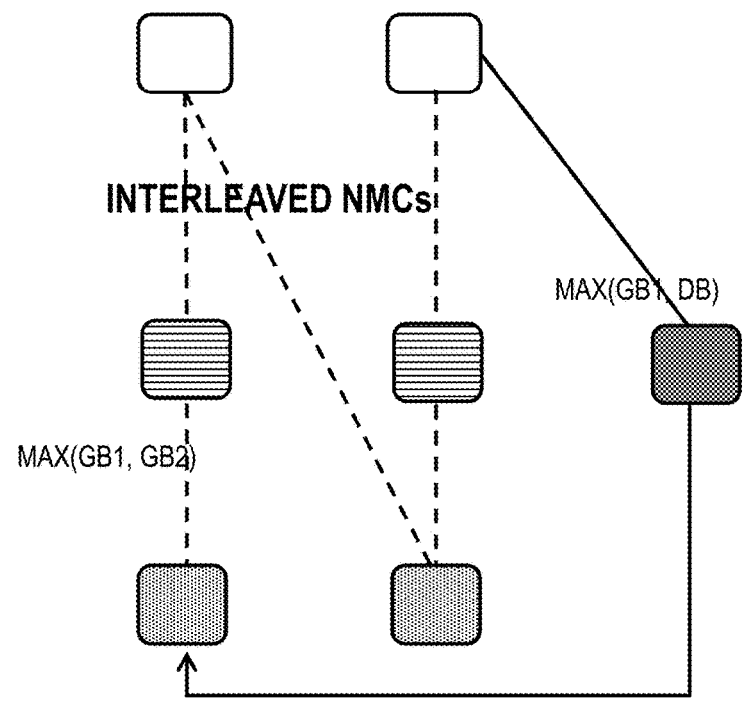
FIG. 12 is graphs of a possible case for NMC ordering for Hamiltonian paths with interleaved NMCs.
Figure 13:
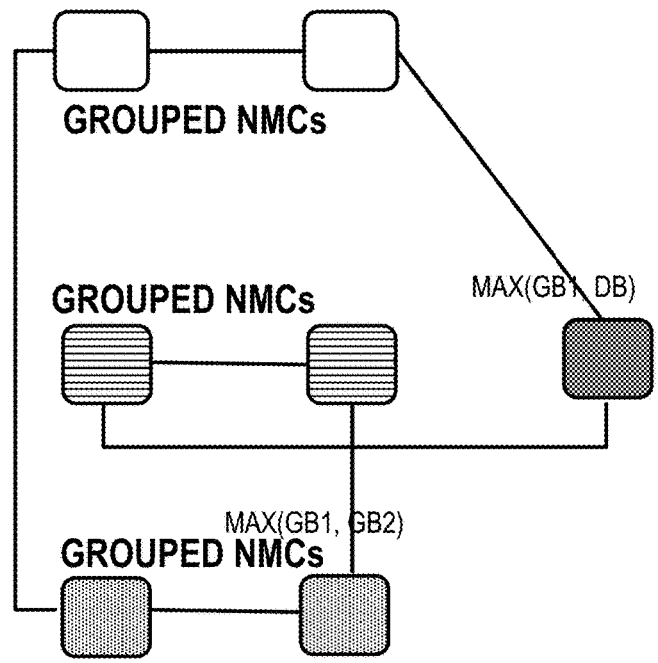
FIG. 13 is a graph of another possible case for NMC ordering for Hamiltonian paths with grouped NMCs.

Referring to FIGS. 12 and 13, in an exemplary embodiment, graphs illustrate two possible cases for NMC ordering for Hamiltonian paths with interleaved NMCs (FIG. 12) and grouped NMCs (FIG. 13). In FIG. 12, for interleaved NMCs, interleaved NMC modem schemes of different types are assigned. If the Hamiltonian path yields to interleave two modem schemes, there are interleaved in MC ordering, and the remaining is assigned in groups. In FIG. 13, for NMC grouping, interleaved groups of the same NMC modem scheme are assigned, e.g., DB-NMC1-NMC1- . . . -NMC2-NMC2- . . . NMC3-NMC3- . . . -DB. The output of the graph algorithm is which NMCs need to be interleaved i.e. which same modem schemes NMC need to be grouped and which need to be interleaved with others.

The Hamiltonian path is used to get the optimal ordering of NMCs. For example, consider three NMCs A, B, C which need different GBs between them. Here, one would like to put the two NMCs with lower GBs together so as to minimize the total MC width. Now, the number of NMCs could be as high as 32, thus, finding the shortest Hamiltonian path is difficult in real time. Thus, the process is reduced to the number of unique modem schemes to minimize the approach.

Spectrum Allocation Schemes

Figure 14:
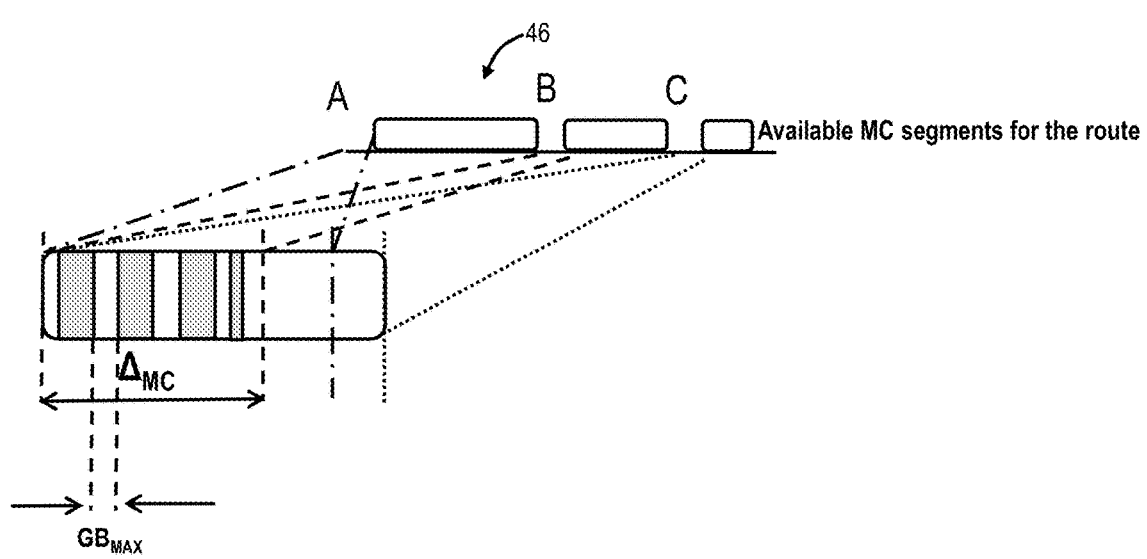
FIG. 14 is a graph of exemplary optical spectrum with MC segments thereon.

Referring to FIG. 14, in an exemplary embodiment, a graph illustrates exemplary optical spectrum with MC segments thereon. Specifically, FIG. 14 illustrates spectrum allocation based on various criterion. First, a best-fit algorithm can be used to pack which allocates the MC fragments that best pack the required MC. This does not fragment the spectrum. Here B is the best fit, thus, allocate the B MC segment. Second, the best fit algorithm can be used with expansion criterion. Let there be defined an expansion criterion to the scale of X GHz. Let the current MC size be Y GHz. The difference being (X−Y) GHz. Now add to MC the size of (X−Y)GHz and find the best fit as mentioned above. In this case, it could be A or C based on (X−Y)GHz value. Now allocate MC such that there is a linear(unweighted) criterion or a weighted criterion (see FIG. 15). For a Left/Right expansion only, a gap of (X−Y) GHz is left on either on left or right while allocating into A or C based on best fit. For a Left and Right expansion, a gap of (X−Y)/2 GHz is left on either on left or right while allocating into A or C based on best fit.

NMC Allocation into MC with Expansion Criterion

Similar to non-contiguous MC allocation, NMC allocation into MC with expansion criterion is also treated as best fit multi-container bin packing problem. The differentiation here comes from the fact that one may want to expand an MC at a later point in time. Thus, an expansion criterion of n carriers is defined with some default size. This expansion value is added to the $\Delta_{sz}$ for the best fit algorithm. Two schemes can be provided here:

Redefine $\Delta_{sz}=\Delta_{sz}+n*NMC_{size}$ and find best fit slot for the same. This will leave room for expansion. In the above case, the allocation could get aligned on either side thus delimiting the expansion of the adjacent MC. Thus, one allocates the MC to leave spectrum n=2 carriers on either side and still follows the best-fit algorithm. Based on this scheme, the MC could be expanded based on the number of carriers provisioned for expansion as default.

Over a period of time, once the network becomes congested, one may want to weight the number of carriers for expansion by the size of current as well as the size of adjacent MCs. Without the knowledge of all services, this is not possible in a distributed control plane, whereas the SDN controller can do the same. Secondly, the distributed control plane can define maximal MC size and weight the expansion carriers inversely to the number of carriers in the current MC being allocated and the amount of spectrum unavailable on either side. This is again enabled by the fact that there is an awareness of all the available MC fragments on the route. Since the spectral gaps for expansion are shared between two MC, the weighting factor can include not only the current MC size being allocated but also of the adjacent MCs.

Figure 15:
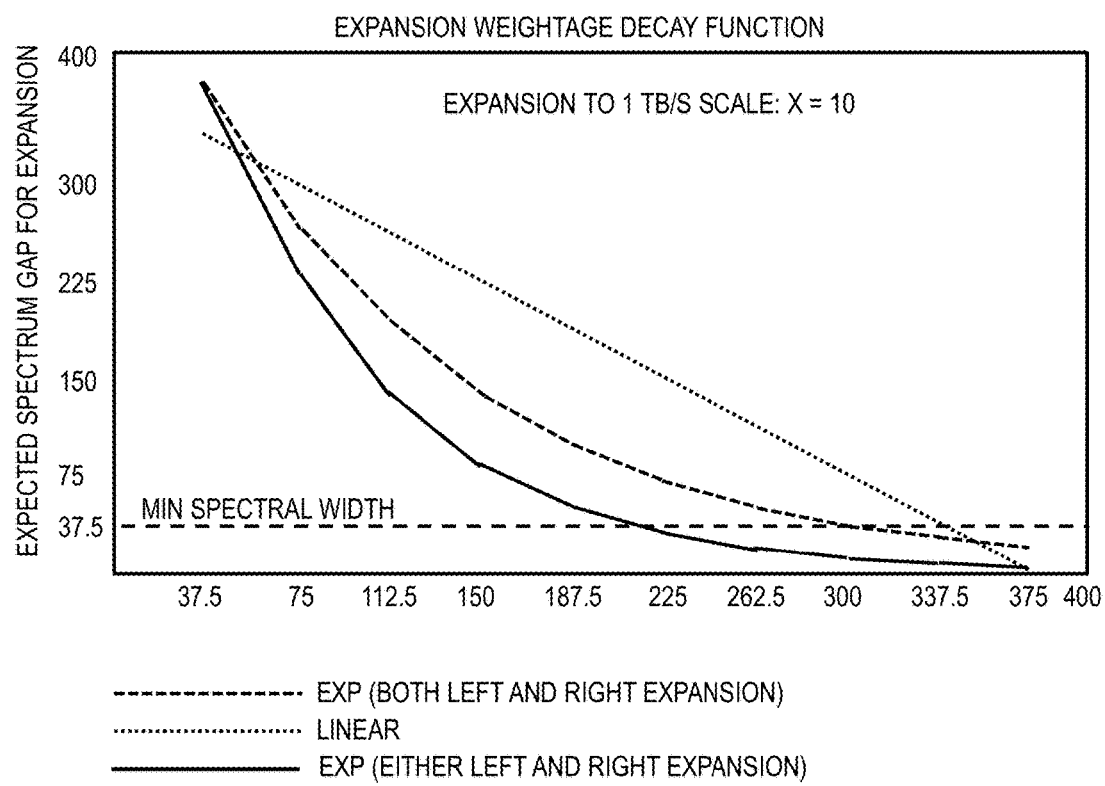
FIG. 15 is a graph of curves of potential strategies for expansion by the control plane based on the size of the current MC.

Referring to FIG. 15, in an exemplary embodiment, a graph illustrates curves of potential strategies for expansion by the control plane based on the size of the current MC. FIG. 15 includes expansion weighting decay functions which can be used in either Left only, Right Only or Left and Right expansion where Right and Left are logical representations of the optical spectrum. One can see based on the expansion scale the margin for expansion can be adjusted.

Figure 16:
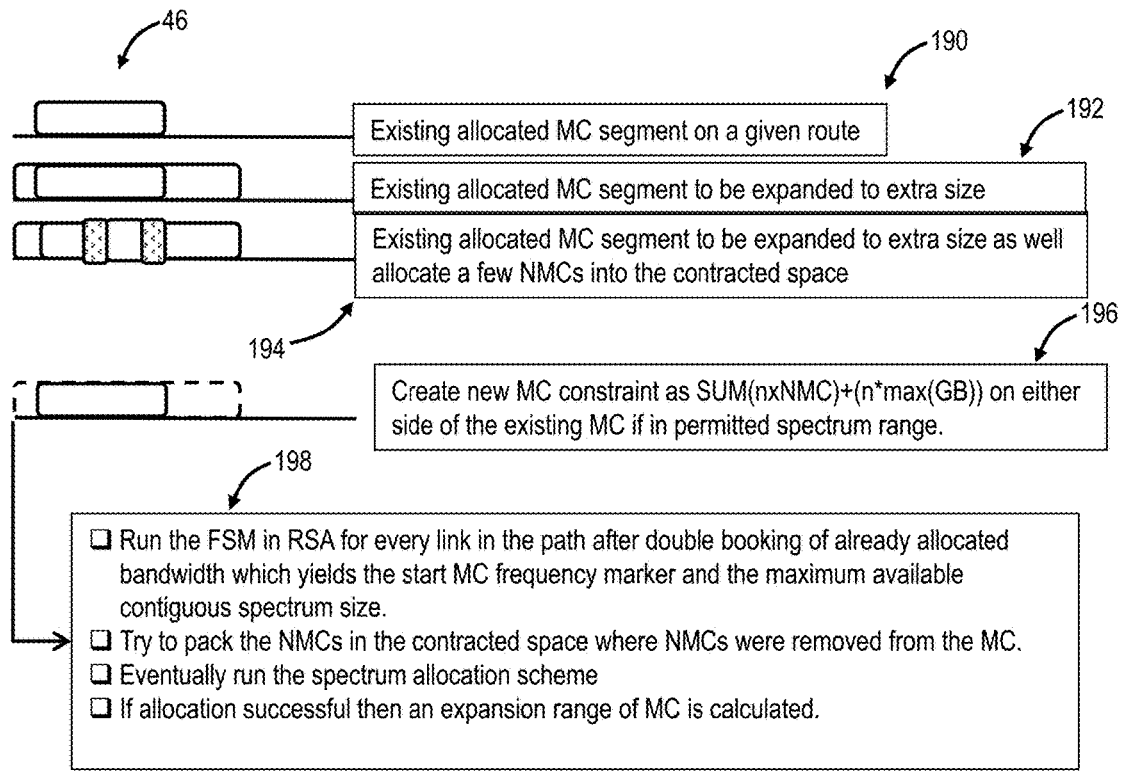
FIG. 16 is a graph of optical spectrum with various strategies for MC expansion.

Referring to FIG. 16, in an exemplary embodiment, a graph illustrates optical spectrum with various strategies for MC expansion. For example, the problem requires the RSA process 80 to compute, given the set of new NMCs, existing MCs and its existing NMCs (step 190), whether it is possible to expand the existing MC either on the left or right side or both to accommodate the new unassigned NMCs on the existing MC route (step 192). Also, given that a certain number of NMCs are being contracted, it is possible to accommodate in the contraction gaps and/or expand the existing MC either on left or right side or both to accommodate the new unassigned NMCs on the existing MC route (step 194).

The expansion can include creating a new MC constraint as SUM(nxNMC)+(n*max(GB)) on either side of the existing MC if in permitted spectrum range (step 196). The FSMs 150, 170 can be run for every link in a path after double booking of already allocated bandwidth which yields the start MC frequency marker and the maximum available contiguous spectrum size. The process 80 can try and pack the NMCs in the contracted space where NMCs were removed from the MC, eventually, run the spectrum allocation scheme described herein, and if the allocation is successful, then an expansion range of the MC can be calculated (step 198).

Figure 17:
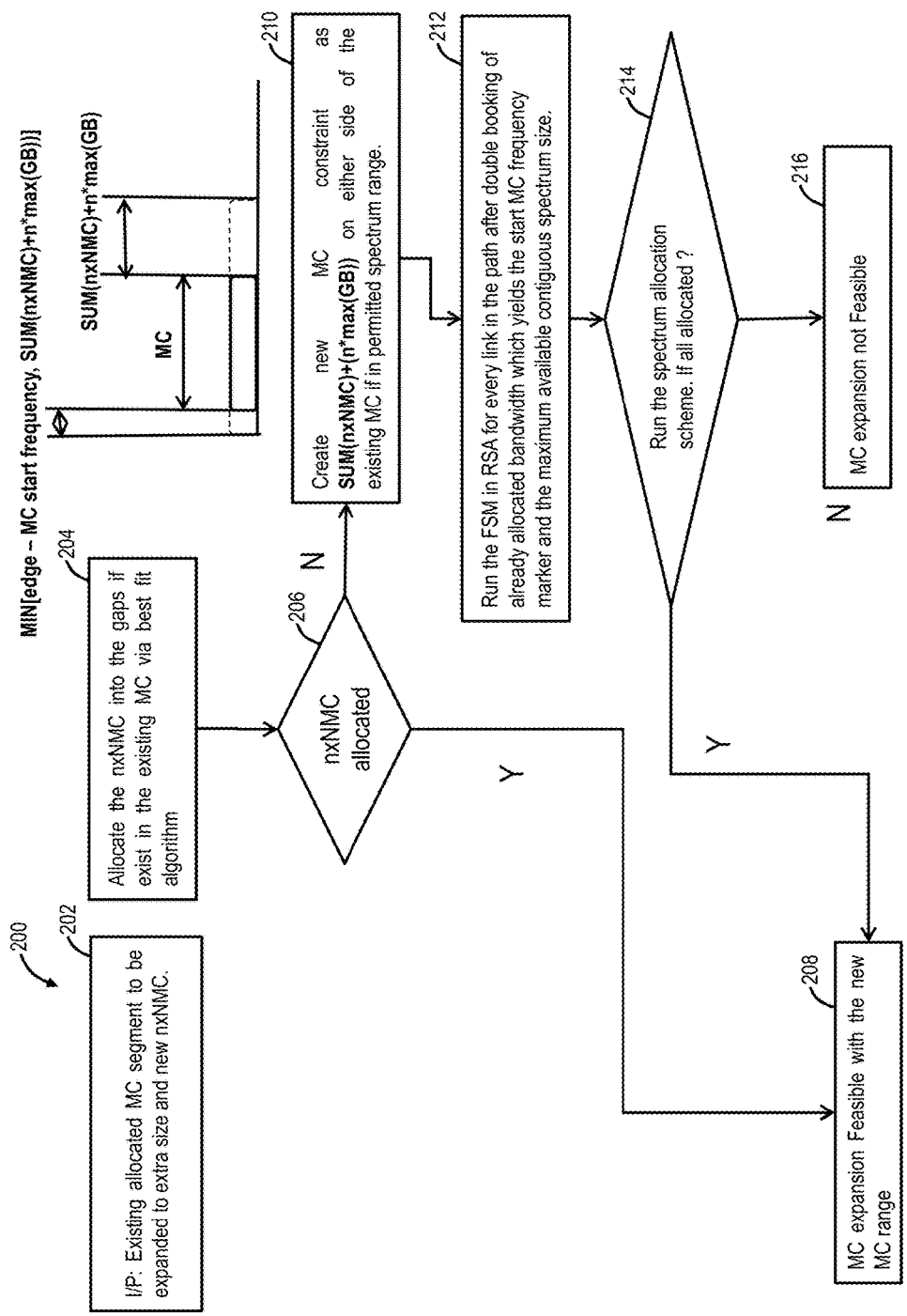
FIG. 17 is a flowchart of an expansion case RSA process.

Referring to FIG. 17, in an exemplary embodiment, a flowchart illustrates an expansion case RSA process 200. The process 200 begins with existing allocated MC segments to be expanded to an extra size and new nxNMCs (step 202). The process 200 first attempts to fit the nxNMCs into the gaps if they exist in the existing MCs via the best-fit algorithm (step 204). If all of the nxNMCs are allocated (step 206), the process 200 ends, and the MC expansion is feasible with the new MC range (step 208). If all of the nxNMCs are note allocated (step 206), the process 200 includes creating a new MC constraint as the SUM(nx NMC)+(n*max(GB)) on either side of the existing MC if in permitted spectrum range (step 210). This is depicted graphically in FIG. 17 as well. The process 200 includes implementing the FSMs 150, 170 for every link in the path after double booking of already allocated bandwidth which yields the start MC frequency marker and the maximum available contiguous spectrum size (step 212). After the FSMs 150, 170, the process 200 includes attempting spectrum allocation, such as step 92 (step 214). If all of the nxNMCs are allocated, the process 200 ends, and the MC expansion is feasible with the new MC range (step 208). If not, MC expansion is not feasible (step 216).

Here, with the gaps is to allow MC expansion given the set of new NMCs to be included. This is because the expansion can be done on either side (left/right) or both sides but the new NMCs need to fit as entities as they cannot be split (spectrum cannot be split). So the idea is to find the maximal contiguous MC channel space around the existing MC and see if a fit for new NMCs could be found. Thus giving us a deterministic output of feasibility of the expansion.

Non-contiguous MC Allocation

Figure 18:
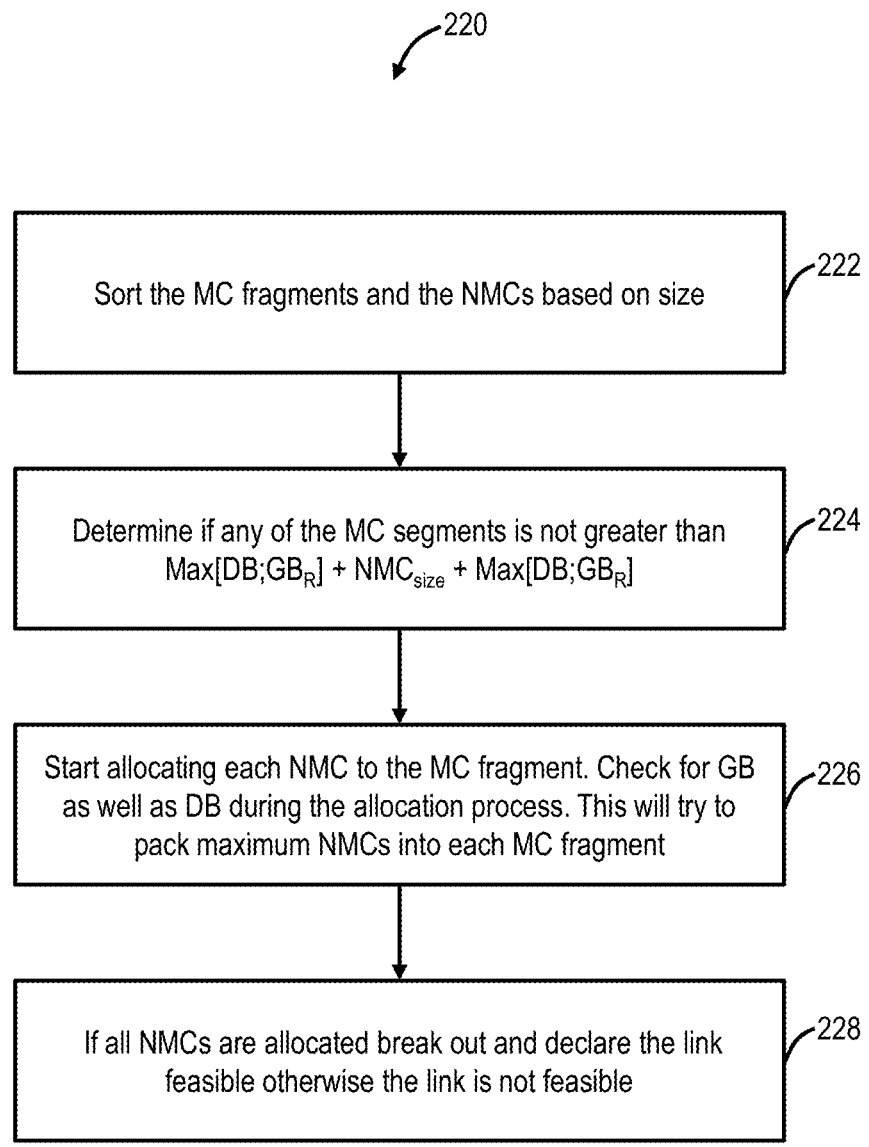
FIG. 18 is a flowchart of a non-contiguous MC allocation process.

Referring to FIG. 18, in an exemplary embodiment, a flowchart illustrates a non-contiguous MC allocation process 220. Non-contiguous MC allocation is a case of multi-container bin-packing problem where all the NMCs or some percentage of NMCs (based on user provided criterion) needs to be assigned. Since the size of channels is variable due to different guard band requirements amongst various modem schemes. Thus, it needs to be done during route computation for feasibility as well as for spectrum allocation. This being an NP-hard problem, it is approached based on a polynomial time greedy or best-fit mechanism.

The allocation process 220 includes sorting the MC fragments and the NMCs based on size (step 222), and determining if any of the MC segments is not greater than Max[DB;$GB_R$]+$NMC_{size}$+Max[DB;$GB_R$] (step 224). Here, the MC segments greater than this size is not able to be allocated in the allocation process 220. Next, the allocation process 220 includes starting allocation of each NMC to the MC fragment and checking for GB as well as DB during the allocation process. This will try to pack maximum NMCs into each MC fragment (step 226). Finally, if all NMCs are allocated break out and declare the link feasible otherwise the link is not feasible (step 228).

Figure 19:
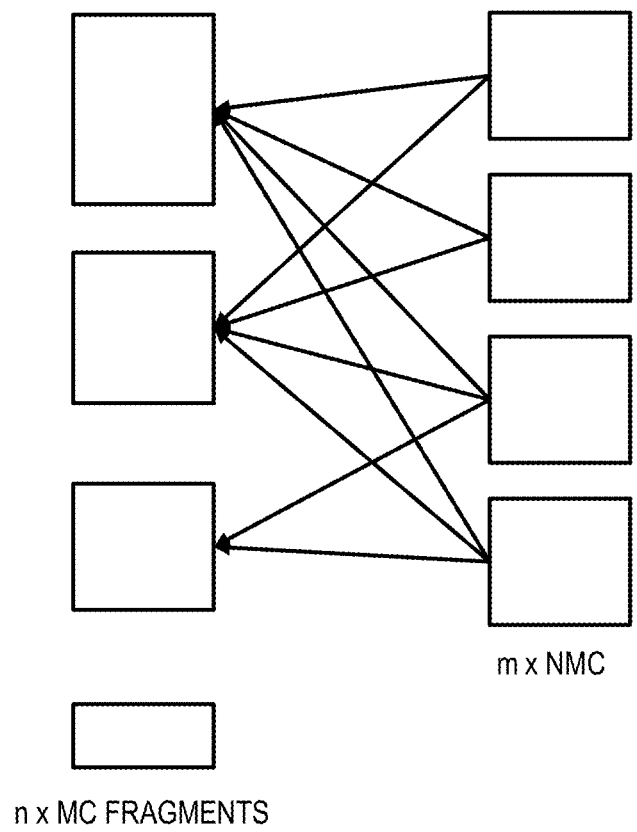
FIG. 19 is a graph illustrating exemplary possibilities for a bipartite graph for bin packing.
Figure 20:
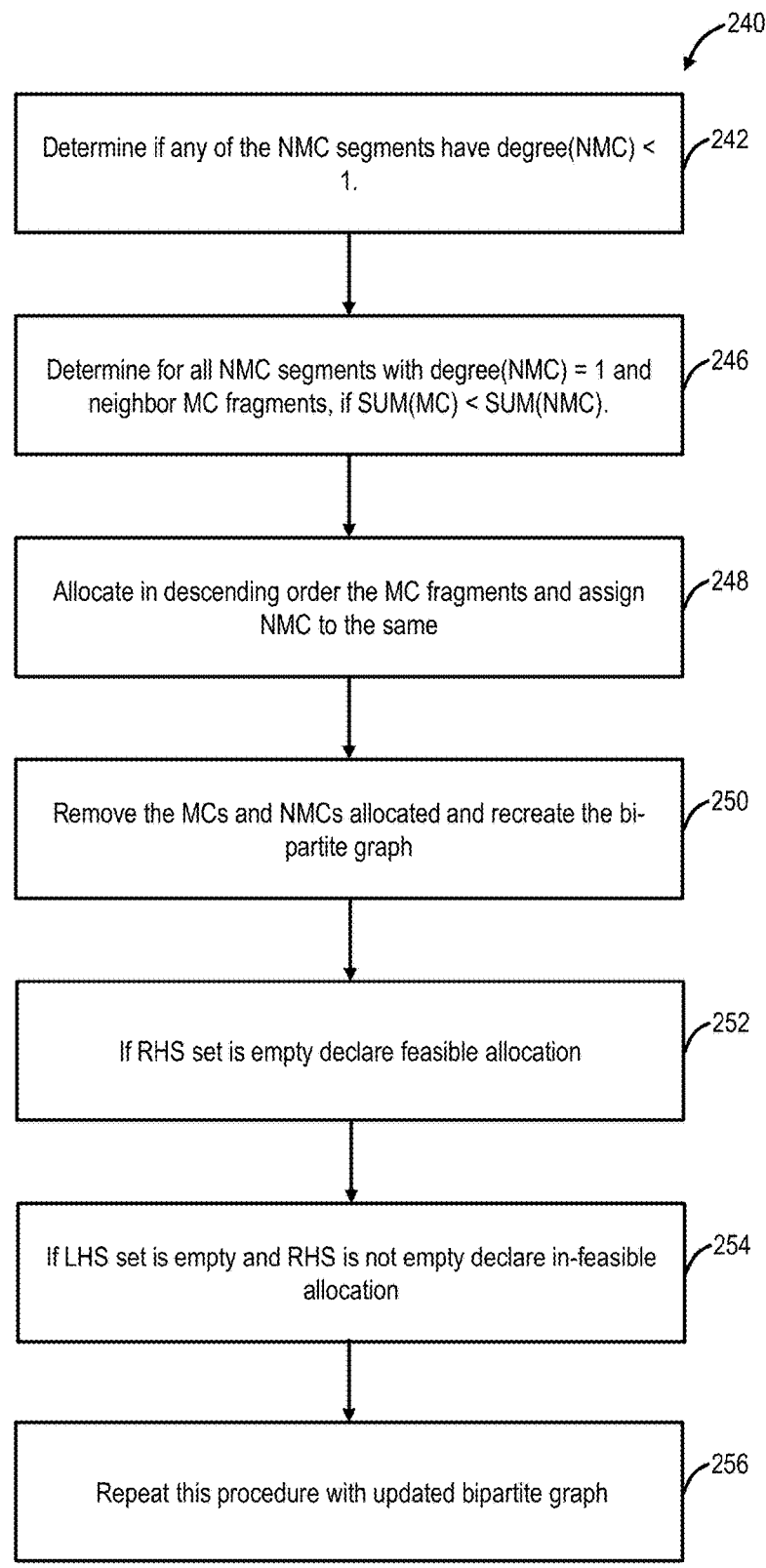
FIG. 20 is a flowchart of a bipartite graph allocation process.

The allocation process 220 is possible only due to the way the freqMarker[ ] and availsz[ ] were calculated during route computation to transform into a multi-container bin-packing problem either with grid based or gridless mechanisms. FIG. 19 is a graph illustrating exemplary possibilities for a bipartite graph for bin packing. Referring to FIG. 20, in an exemplary embodiment, a flowchart illustrates a bipartite graph allocation process 240. The bipartite graph allocation process 240 follows branch and bound for one path in the tree of possibilities to get some feasibility in polynomial time.

The bipartite graph allocation process 240 includes determining if any of the NMC segments have degree(NMC)<1 (step 242), determining for all NMC segments with degree (NMC)=1 and neighbor MC fragments, if SUM(MC)<SUM (NMC) (step 244), allocating in descending order the MC fragments and assigning NMC to the same (step 246), removing the MCs and NMCs allocated and recreating the bipartite graph (step 248), if the Right Hand Set (RHS) is empty then declaring feasible allocation (step 250), if the Left Hand Set (LHS) is empty and the RHS is not empty then declaring an infeasible allocation (step 252), and repeating the steps with the updated bipartite graph. The bipartite graph allocation process 240 is a branch and bound strategy for allocation, and while sub optimal, it provides real time computation.

Figure 21:
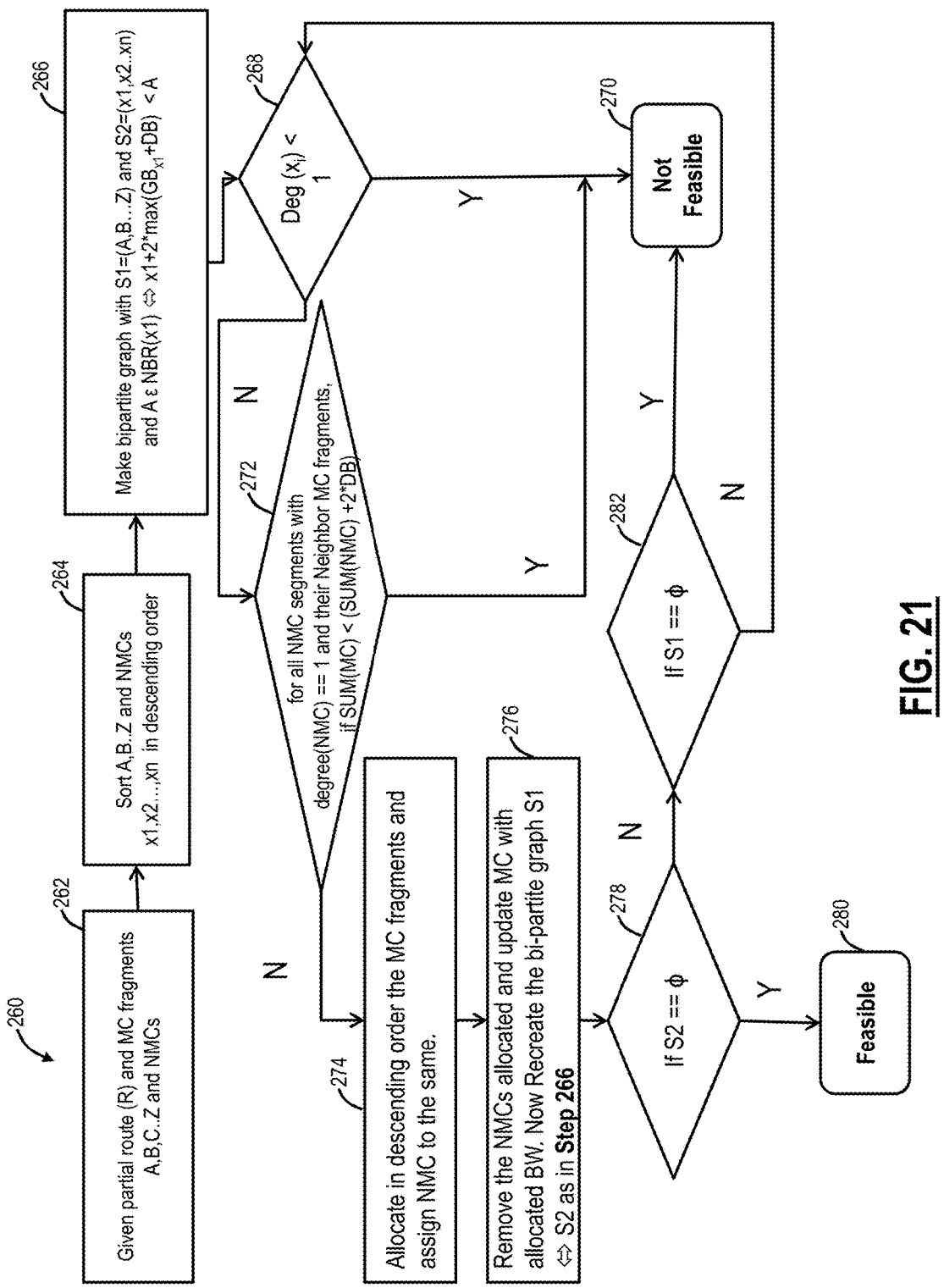
FIG. 21 is a flowchart of a non-contiguous MC allocation RSA process.

Referring to FIG. 21, in an exemplary embodiment, a flowchart illustrates a non-contiguous MC allocation RSA process 260. The process 260 starts given a partial route R and MC fragments A, B, C, . . . , Z and NMCs (step 262). The process 262 includes sorting the MC fragments A, B, C, . . . , Z and NMCs x1, x2, . . . , xn in descending order (step 264). Next, the process 260 includes making a bipartite graph with S1=(A, B . . . Z) and S2=(x1, x2 . . . xn) and A∈NBR(x1)⇔x1+2*max($GB_{x1}$+DB)<A (step 266). If the Degree of xi in the graph is <1 (step 268), there is no feasible solution (step 270). If the Degree of xi is ≥1 (step 268), the process 260 includes, for all NMC segments with degree (NMC)==1 and their Neighbor MC fragments, if SUM(MC) <(SUM(NMC)+2*DB) (step 272), and if this is the case, there is no feasible solution (step 270), else, the process 260 allocates in descending order the MC fragments and assigns the NMC to the same (step 274), and removes the NMCs allocated and updates the MC with allocated bandwidth and recreates the bi-partite graph S1⇔S2 as in Step 266 (step 276). If S2==ϕ (step 278), there is a feasible solution (step 280), and if not and if S1==ϕ (step 282), there is no feasible solution (step 270). If S1==ϕ is false (step 282), the process 260 returns to step 268.

Control Plane Flooding for Gridless Networks

The gridless scheme described resolves two problems as mentioned earlier and thus is spectrally efficient as well as aligns MC allocation perfectly on a real line. However, it provides a challenge in flooding of information sized about 1K if the resolution is 1 MHz. The example of the same is given in FIG. 3. Here the markers 40 represent the start of MC and the end of MC. The inverse implies occupied spectral bandwidth. This can be simply used in RSA for allocation and specifies a contracted representation of the 4.8 THz bandwidth on a link 14. The difference in the 1 MHz vs. 100 MHz resolution is the flooded bandwidth which could be either a 32 or 16 but variable. This can either be used directly in RSA or can be converted to a grid as explained in previous sections. The worst case flooding may require to flood 128 MC ranges, whichever increased further to 384 will lead to flooding 2K or 1K data respectively. Being inefficient in flooding but spectrally efficient this is still a viable option. Also, if the number of MC occupied is not the worst case of 128 on each link as well the resolution required is 100 MHz, hence it is a practical solution.

Gridless Optical Routing and Spectrum Assignment Process

Figure 22:
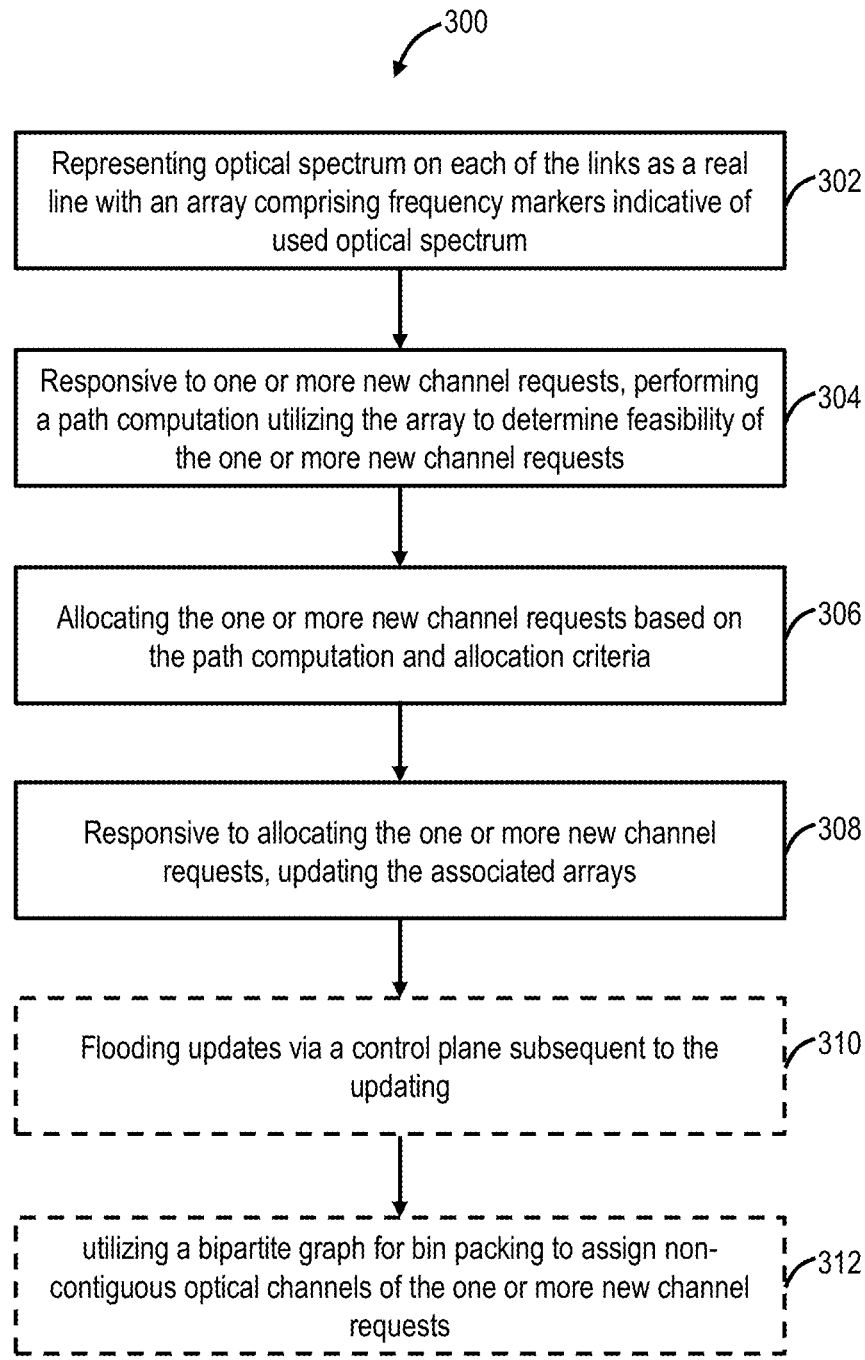
FIG. 22 is a flowchart of a process implemented by a processing device for gridless optical routing and spectrum assignment on links in an optical network.

Referring to FIG. 22, in an exemplary embodiment, a flowchart illustrates a process 300 implemented by a processing device for gridless optical routing and spectrum assignment on links 14 in an optical network 10. The process 300 includes representing optical spectrum on each of the links as a real line with an array comprising frequency markers indicative of used optical spectrum (step 302); responsive to one or more new channel requests, performing a path computation utilizing the array to determine feasibility of the one or more new channel requests (step 304); allocating the one or more new channel requests based on the path computation and allocation criteria (step 306); and, responsive to allocating the one or more new channel requests, updating the associated arrays (step 308). The process 300 can also include flooding updates via a control plane subsequent to the updating (step 310). The process 300 can also include utilizing a bipartite graph for bin packing to assign non-contiguous optical channels of the one or more new channel requests (step 312).

The allocating can utilize a modified graph, and the allocating is based on a minimal Hamiltonian path through the modified graph. The new channel request can include a media channel or a super channel. The representing can further include utilizing a grid vector in addition to the frequency markers, wherein the grid vector delineates the optical spectrum into finely granular grids for management thereof. The path computation can be performed via a Finite State Machine using the array to determine the feasibility for each link. The allocating can include an expansion factor enabling the one or more new channel requests to support additional capacity. The allocating can include first attempting to assign the one or more new channel requests to gaps in existing media channels.

Exemplary Server

Figure 23:
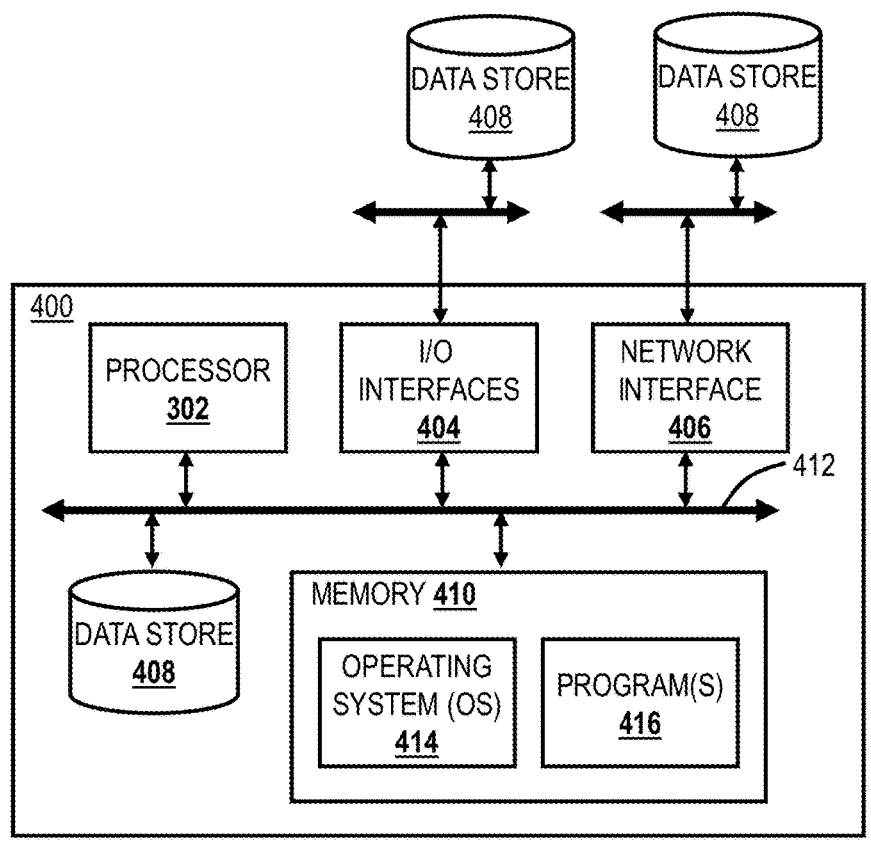
FIG. 23 is a block diagram of a server such as for the servers in FIG. 1, for a processing device to implement the control plane in FIG. 1, for an SDN controller, a Path Computation Element (PCE), etc.

Referring to FIG. 23, in an exemplary embodiment, a block diagram illustrates a server 400 such as for the servers 16, for a processing device to implement the control plane 18, for an SDN controller, a Path Computation Element (PCE), etc. The server 400 is a processing device which can be utilized to perform gridless optical routing and spectrum assignment on links in an optical network. The server 400 can be a digital computer that, in terms of hardware architecture, generally includes a processor 402, input/output (I/O) interfaces 404, a network interface 406, a data store 408, and memory 410. It should be appreciated by those of ordinary skill in the art that FIG. 24 depicts the server 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example, but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 can include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the server 400, a semiconductor-based microprocessor (in the form of a microchip or chip set), or generally any device for executing software instructions. When the server 400 is in operation, the processor 402 is configured to execute software stored within the memory 410, to communicate data to and from the memory 410, and to generally control operations of the server 400 pursuant to the software instructions. The I/O interfaces 404 can be used to receive user input from and/or for providing system output to one or more devices or components. User input can be provided via, for example, a keyboard, touchpad, and/or a mouse. System output can be provided via a display device and a printer (not shown). I/O interfaces 404 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 406 can be used to enable the server 400 to communicate on a network. The network interface 406 can include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n). The network interface 406 can include address, control, and/or data connections to enable appropriate communications on the network. A data store 408 can be used to store data. The data store 408 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 can incorporate electronic, magnetic, optical, and/or other types of storage media. In one example, the data store 408 can be located internal to the server 400 such as, for example, an internal hard drive connected to the local interface 412 in the server 400. Additionally, in another embodiment, the data store 408 can be located external to the server 400 such as, for example, an external hard drive connected to the I/O interfaces 404 (e.g., SCSI or USB connection). In a further embodiment, the data store 408 can be connected to the server 400 through a network, such as, for example, a network attached file server.

The memory 410 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 410 can incorporate electronic, magnetic, optical, and/or other types of storage media. Note that the memory 410 can have a distributed architecture, where various components are situated remotely from one another, but can be accessed by the processor 402. The software in memory 410 can include one or more software programs, each of which includes an ordered listing of executable instructions for implementing logical functions. The software in the memory 410 includes a suitable operating system (O/S) 414 and one or more programs 416. The operating system 414 essentially controls the execution of other computer programs, such as the one or more programs 416, and provides scheduling, input-output control, file and data management, memory management, and communication control and related services. The one or more programs 416 may be configured to implement the various processes, algorithms, methods, techniques, etc. described herein.

In an exemplary embodiment, a processing device adapted for gridless optical routing and spectrum assignment on links in an optical network includes a processor; and memory storing instructions that, when executed, cause the processor to represent optical spectrum on each of the links as a real line with an array comprising frequency markers indicative of used optical spectrum, perform, responsive to one or more new channel requests, a path computation utilizing the array to determine feasibility of the one or more new channel requests, allocate the one or more new channel requests based on the path computation and allocation criteria, and update the associated arrays responsive to allocation of the one or more new channel requests. The one or more new channel requests can be allocated using a modified graph and based on a minimal Hamiltonian path through the modified graph.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method implemented by a processing device in an optical network, the method comprising:
responsive to one or more new channel requests for the optical network comprising a plurality of links and a plurality nodes that utilize gridless optical routing and spectrum assignment, performing a path computation utilizing frequency markers to determine feasibility of the one or more new channel requests, wherein optical spectrum on the plurality of links is represented as a real line with the frequency markers indicative of used optical spectrum to support the gridless optical routing and spectrum assignment, wherein the frequency markers are maintained in a data store associated with the processing device, wherein the processing device is in communication with one or more of the nodes;
configuring nodes in the optical network associated with the one or more new channel requests on one or more links to utilize associated optical spectrum thereon based on the path computation, the frequency markers, and allocation criteria; and responsive to the configuring of the one or more new channel requests, updating the associated frequency markers on the real line in the data store for the one or more links.

2. The method of claim 1, wherein the allocating utilizes a modified graph and the allocating, which is one or more of grouped and interleaved based on varying Guard Bands and Dead Bands, is based on a minimal Hamiltonian path through the modified graph.

3. The method of claim 1, further comprising:
flooding updates via a control plane subsequent to the updating.

4. The method of claim 1, wherein the new channel request comprises a media channel or a super channel.

5. The method of claim 1, wherein the representing further comprises utilizing a grid vector in addition to the frequency markers, wherein the grid vector delineates the optical spectrum into finely granular grids for management thereof.

6. The method of claim 1, wherein the path computation is performed via a Finite State Machine using the frequency markers to determine the feasibility for each link.

7. The method of claim 1, further comprising:
utilizing a bipartite graph for bin packing to assign non-contiguous optical channels of the one or more new channel requests.

8. The method of claim 1, wherein the allocating comprises an expansion factor enabling the one or more new channel requests to support additional capacity.

9. The method of claim 1, wherein the allocating comprises first attempting to assign the one or more new channel requests to gaps in existing media channels.

10. A system comprising:
circuitry adapted to perform a path computation utilizing frequency markers, to determine feasibility of the one or more new channel requests responsive to one or more new channel requests for an optical network comprising nodes interconnected by a plurality of links that utilize gridless optical routing and spectrum assignment, wherein optical spectrum on the plurality of links is represented as a real line with the frequency markers indicative of used optical spectrum to support the gridless optical routing and spectrum assignment, wherein the frequency markers are maintained in a data store associated with the processing device;
circuitry adapted to cause allocation, through configuration of a plurality of nodes in the optical network, of the one or more new channel requests on one or more links to utilize associated optical spectrum thereon based on the path computation, the frequency markers, and allocation criteria; and
circuitry adapted to update the associated frequency markers on the real line for the one or more links responsive to the allocation of the one or more new channel requests in the data store that is communicatively coupled to the plurality of nodes.

11. The system of claim 10, wherein the circuitry adapted to allocate utilizes a modified graph and the allocating, which is one or more of grouped and interleaved based on varying Guard Bands and Dead Bands, is based on a minimal Hamiltonian path through the modified graph.

12. The system of claim 10, further comprising:
circuitry adapted to flood updates via a control plane subsequent to updates.

13. The system of claim 10, wherein the new channel request comprises a media channel or a super channel.

14. The system of claim 10, wherein the circuitry adapted to represent further utilizes a grid vector in addition to the frequency markers, wherein the grid vector delineates the optical spectrum into finely granular grids for management thereof.

15. The system of claim 10, wherein the path computation is performed via a Finite State Machine using the frequency markers to determine the feasibility for each link.

16. The system of claim 10, further comprising:
circuitry adapted to utilize a bipartite graph for bin packing to assign non-contiguous optical channels of the one or more new channel requests.

17. The system of claim 10, wherein the circuitry adapted to allocate utilizes an expansion factor enabling the one or more new channel requests to support additional capacity.

18. The system of claim 10, wherein the circuitry adapted to allocate first attempts to assign the one or more new channel requests to gaps in existing media channels.

19. A processing device comprising:
a network interface communicatively coupled to an optical network;
a processor communicatively coupled to a data store and the network interface; and
memory storing instructions that, when executed, cause the processor to
responsive to one or more new channel requests for the optical network that includes a plurality of links that utilize gridless optical routing and spectrum assignment, perform a path computation utilizing frequency markers to determine feasibility of the one or more new channel requests on corresponding links of the plurality of links, wherein optical spectrum on the plurality of links is represented as a real line with the frequency markers indicative of used optical spectrum to support the gridless optical routing and spectrum assignment, wherein the frequency markers are maintained in the data store,
cause allocation of the one or more new channel requests on one or more links to utilize associated optical spectrum thereon based on the path computation, the frequency markers, and allocation criteria, and
responsive to the allocation of the one or more new channel requests, update the associated frequency markers on the real line in the data store for the one or more links.

20. The processing device of claim 19, wherein the one or more new channel requests are allocated using a modified graph and based on a minimal Hamiltonian path through the modified graph, wherein the allocation is one or more of grouped and interleaved based on varying Guard Bands and Dead Bands.

* * * * *